Figure 1:
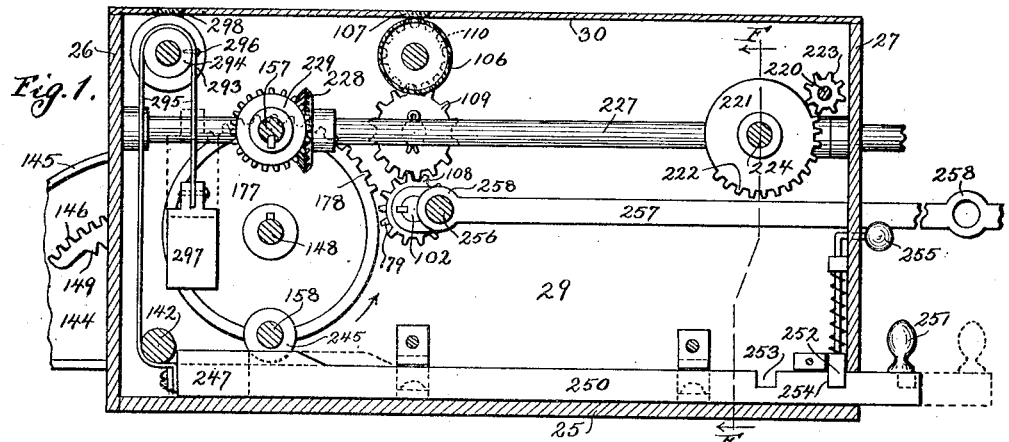

J. H. McELROY.
VOTING MACHINE.
APPLICATION FILED APR. 10, 1901.

1,110,811.

Patented Sept. 15, 1914.

8 SHEETS—SHEET 1.

Witnesses:
R. J. Jaeller
Lawrence Larsen

Inventor:
John Howard McElroy

J. H. McELROY.
VOTING MACHINE.
APPLICATION FILED APR. 10, 1901.

1,110,811.

Patented Sept. 15, 1914.

8 SHEETS—SHEET 2.

Witnesses:
R. J. Jacker
Lawrence Larsen

Inventor:
John Howard McElroy

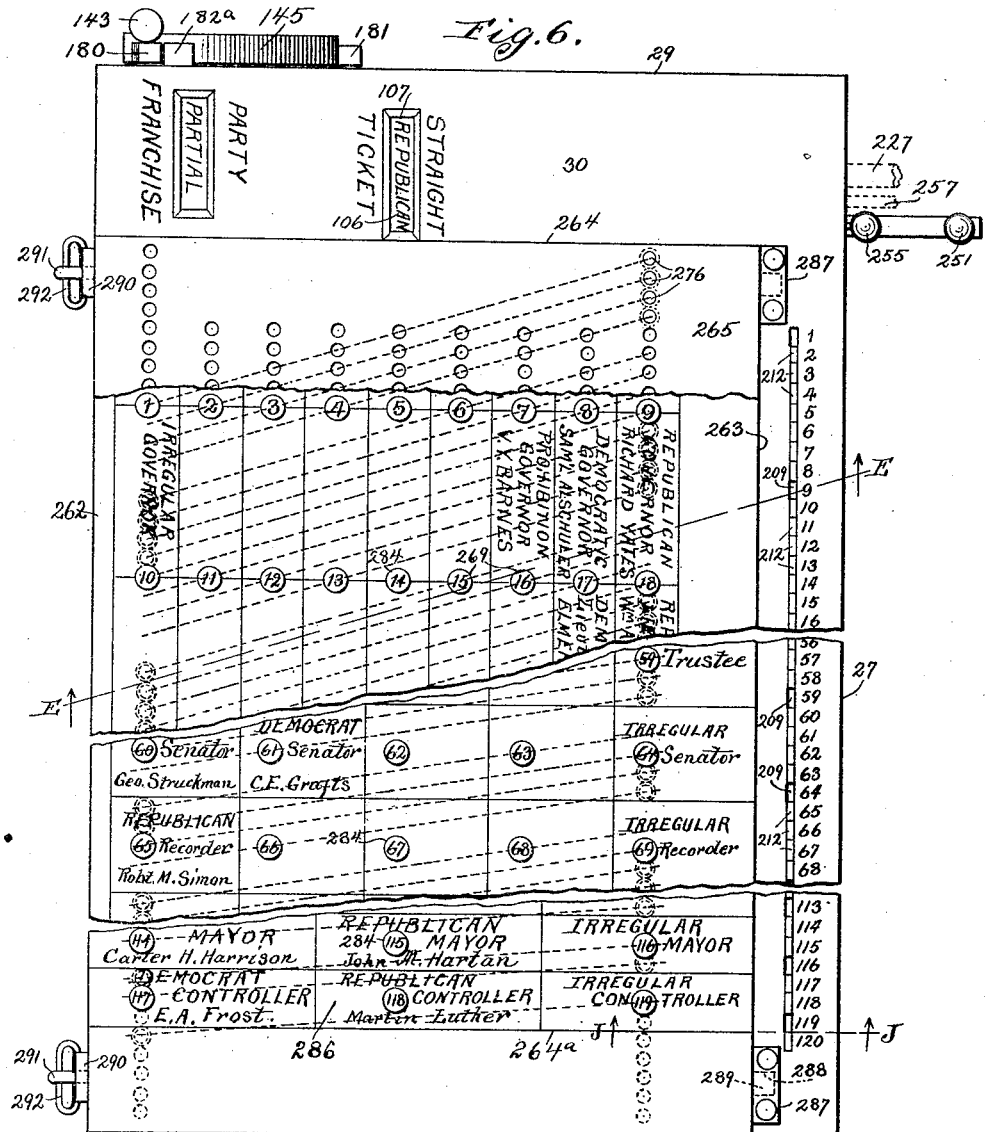
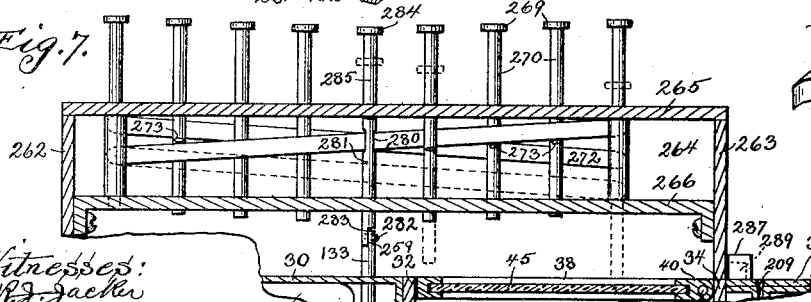

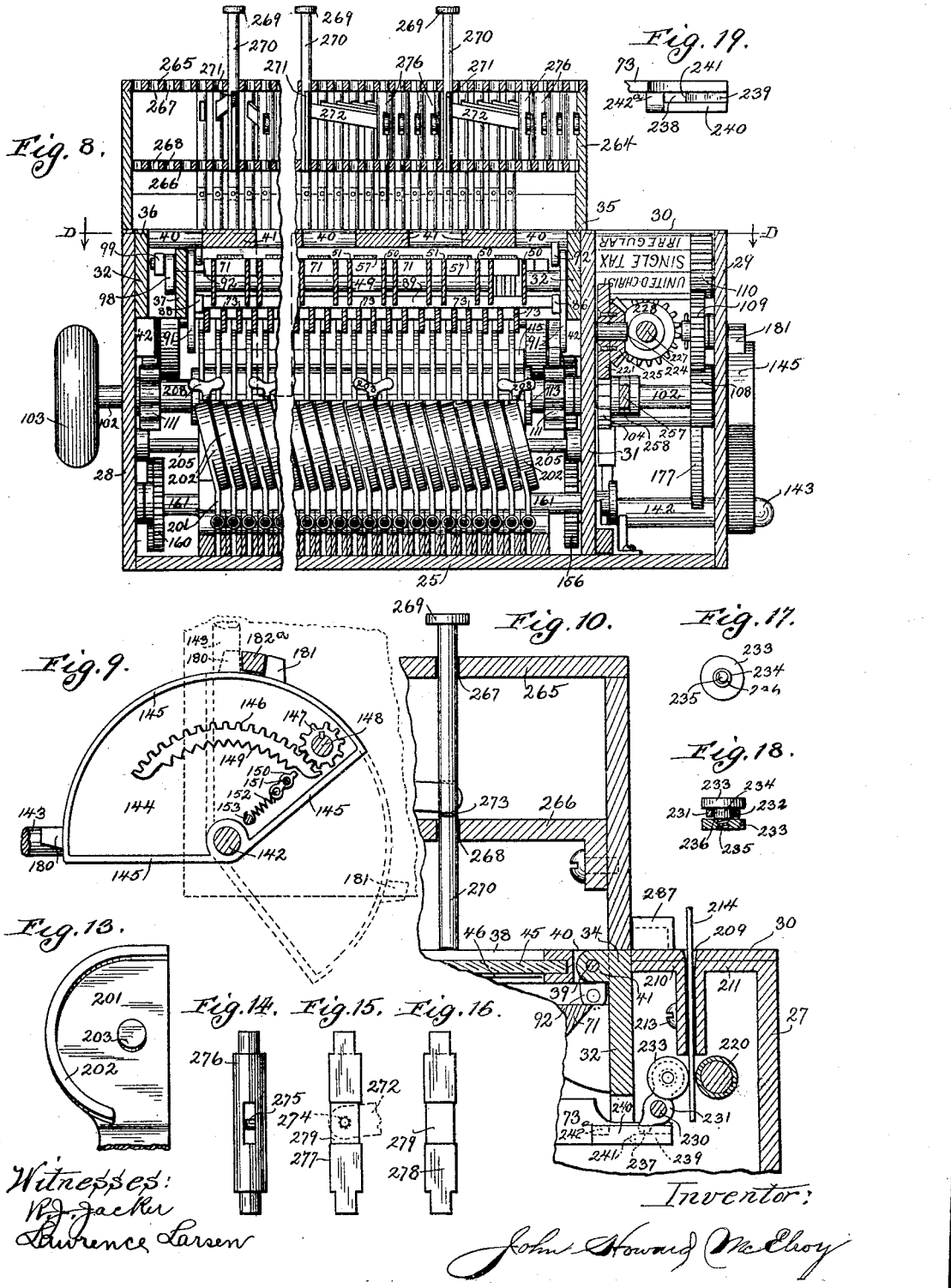

J. H. McELROY.
VOTING MACHINE.
APPLICATION FILED APR. 10, 1901.
1,110,811.
Patented Sept. 15, 1914.
8 SHEETS—SHEET 5.
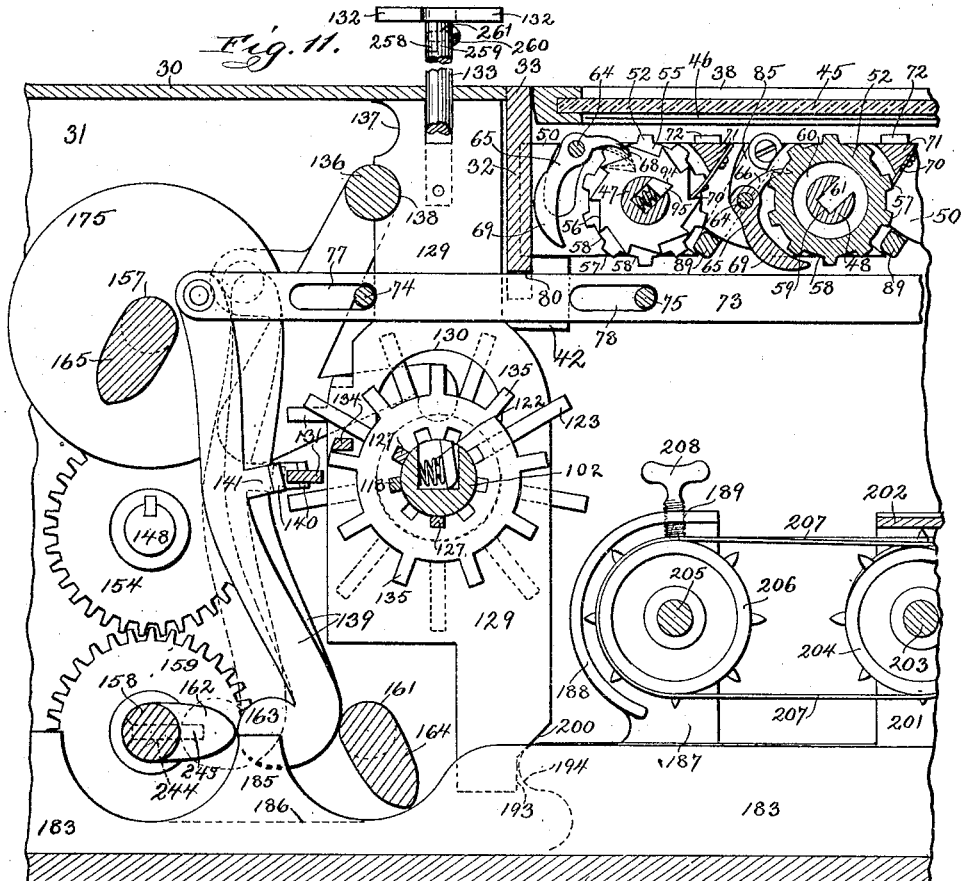
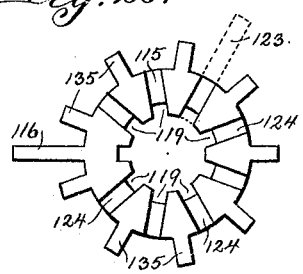
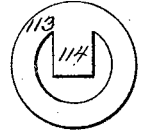
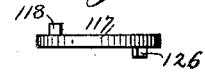
Witnesses
R J Jacker
Lawrence Larsen
Inventor,
John Howard McElroy.

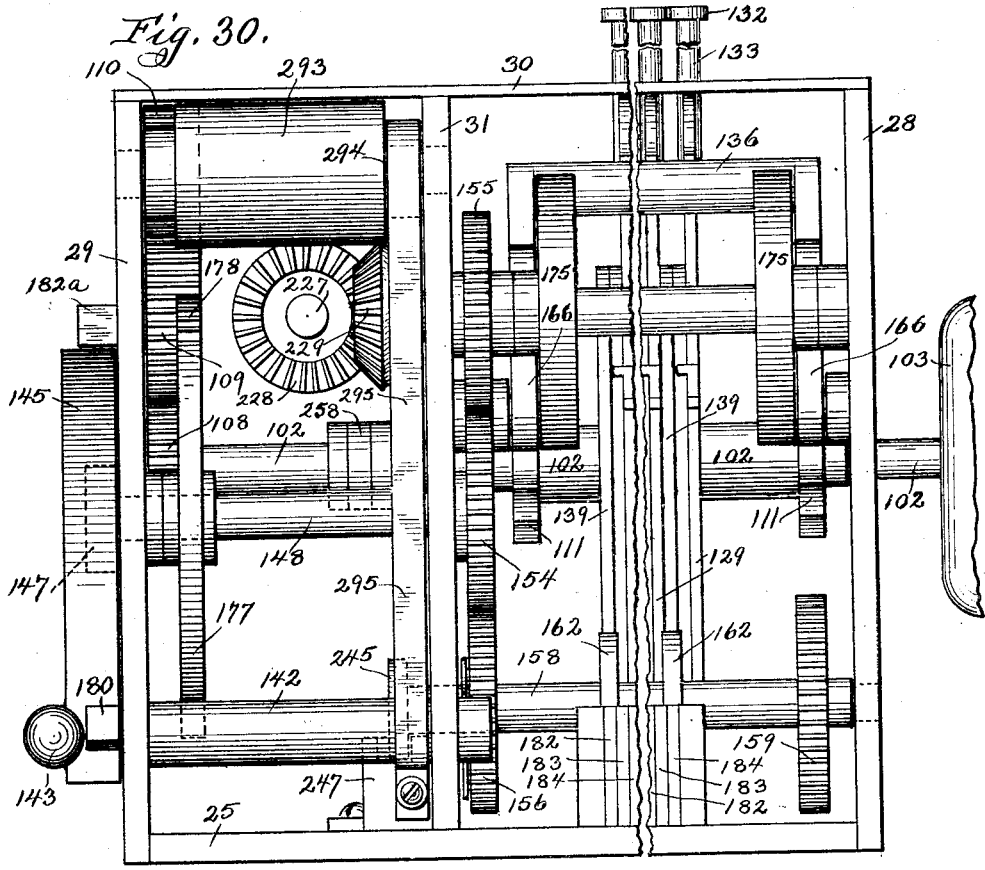

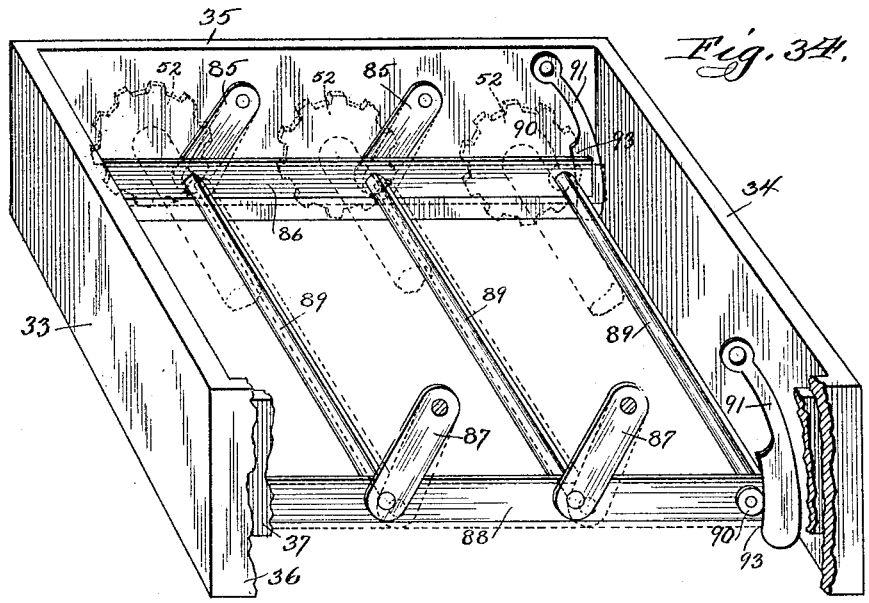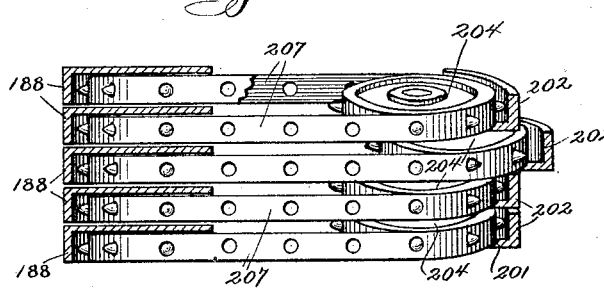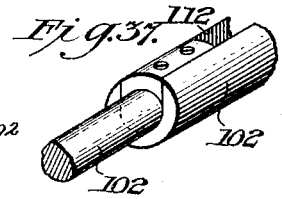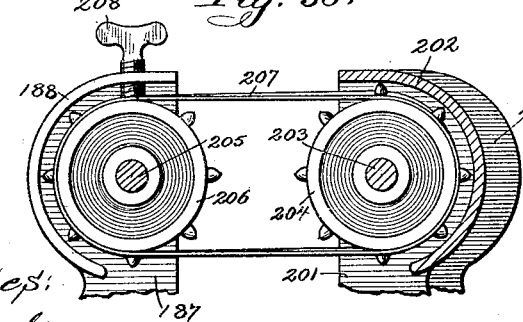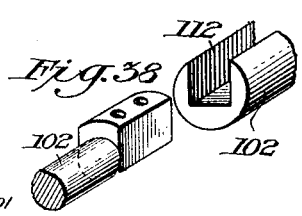

J. H. McELROY.
VOTING MACHINE.
APPLICATION FILED APR. 10, 1901.

1,110,811.

Patented Sept. 15, 1914.
8 SHEETS—SHEET 8.

Witnesses:
H. G. Barrett
Robert N. Weir

Inventor:
John Howard McElroy

UNITED STATES PATENT OFFICE.

JOHN HOWARD McELROY, OF CHICAGO, ILLINOIS.

VOTING-MACHINE.

1,110,811.   Specification of Letters Patent.   Patented Sept. 15, 1914.

Application filed April 10, 1901. Serial No. 55,251.

*To all whom it may concern:*

Be it known that I, JOHN HOWARD MCELROY, a resident of Chicago, in the county of Cook and State of Illinois, have invented certain new and useful Improvements in Voting-Machines, of which the following is a specification.

My present invention is concerned primarily with a novel mechanism for voting straight tickets, which mechanism is radically new in that it is applicable to ballots in which the candidates are arranged in alphabetical order. Hitherto, straight ticket mechanisms have been only applicable to ballots where the candidates were arranged in party columns and office rows; or if they were arranged in office groups in a single column, they were applicable only to machines in which the candidates of each of the various parties occupied the same relative position in each of the office groups.

With my present invention, the relative arrangement of the candidates in the different groups becomes immaterial.

Furthermore, to provide for the alphabetical arrangement of candidates on the ballot, I make the straight ticket mechanism so that it can be adjusted for different elections to accommodate the different relative arrangements of the party candidates in each office group necessitated by the different names of the candidates at different elections.

Another feature of my invention is found in the construction whereby the straight ticket mechanism can be adjusted to accommodate two or any number of parties without the necessity of providing a number of registers and keys in each office group equal to that of the largest number of parties that will be in the field at any election. As these machines have hitherto been constructed, where straight ticket mechanism was employed, it was necessary to provide in each office group a number of keys and registers equal to the largest number of candidates ever in the field, which in presidential years sometimes amounts to ten or more parties, which would necessitate providing the machine with at least ten registers in each single office group. In the next elections, which are usually local ones, there are ordinarily not more than two to four parties in the field, so that with the ordinary construction, from six to eight of the registers in each group are not in use. With my improved construction, each group can be regulated to the size necessary to just accommodate the number of parties in the field, and the straight ticket mechanism can also be arranged accordingly.

Another feature of my invention is a straight ticket mechanism in which the register devoted to any particular candidate may, if said candidate is nominated for the same office by two or more parties, be arranged to be actuated by the straight ticket mechanism of each of the parties nominating said candidate.

Another feature of my invention is embodied in a construction whereby I am enabled to arrange the ballot upon the machine in party columns and office rows as required by the laws of some States, and still have it adjustable for different elections so that it shall have only so many party columns at any election as may be required. As these party column machines have hitherto been constructed, it was necessary to provide a number of party columns as great as the largest number of candidates for each single office ever in the field, which in presidential years sometimes amounts to nine or more, thus necessitating a machine having nine or more party columns. In the next election, which is usually a local one, there are ordinarily not more than three or four candidates for each office in the field, so that with the ordinary construction only that number of the party columns would be in use while the rest were idle. A machine embodying my invention is so arranged that the registers can be thrown into any desired number of party columns, and I have illustrated a specific construction in which any number from two to nine can be employed, so that at any election no idle party columns need be upon the machine.

Another feature of my invention is the novel mechanism by which the position of the setting key controls the actuation of the coöperating register. The mechanism which I employ for this purpose is radically different from any with which I am acquainted, and involves a radically novel mode of operation.

Still another feature of my invention is found in the radically novel mechanism and method by which I control the number of candidates that can be voted for by a limited franchise voter.

Another feature of my invention is a novel combination of resetting and key-locking mechanism with the booth or curtain opening and closing element so arranged that as the booth is closed or the curtain is drawn, the keys will be reset before the final operation of the registers is determined.

My invention is also concerned with certain specific structures devised to carry out the various operations of the machine, all as will be fully and at length set out in the annexed specification, and specifically pointed out in the claims.

Figure 2:
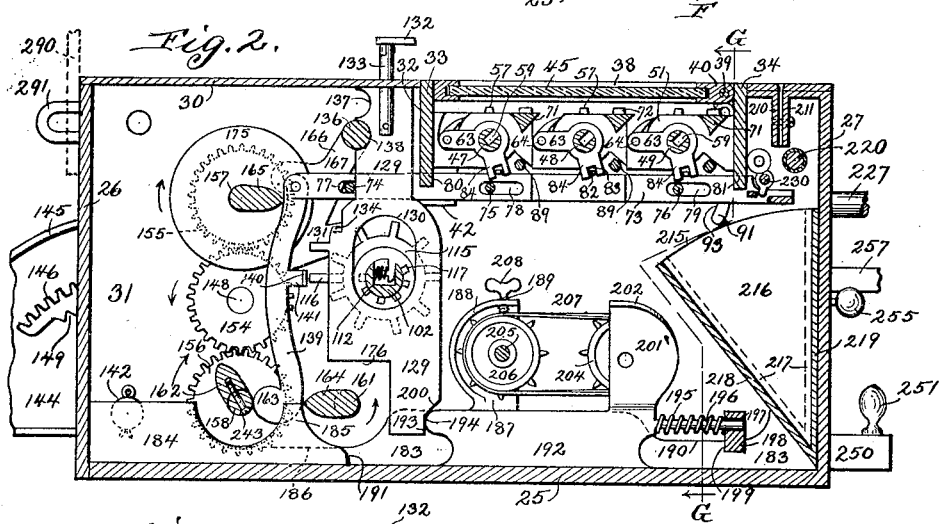
Figure 3:
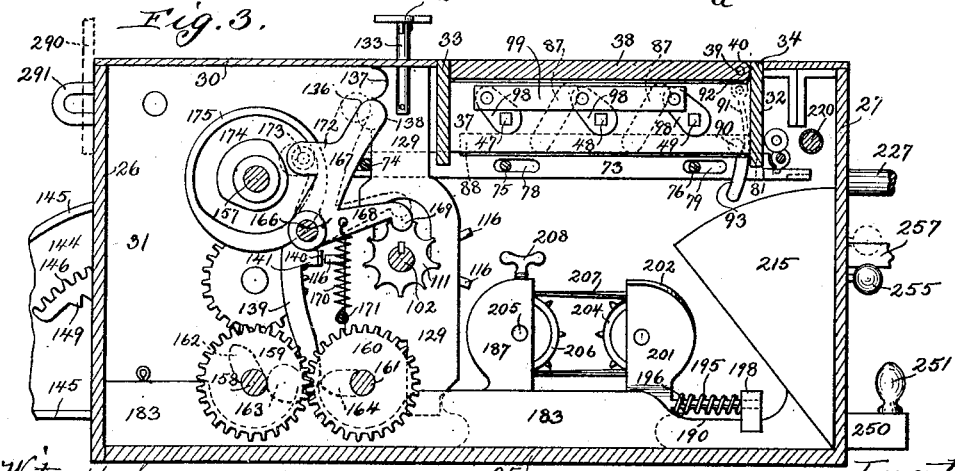
Figure 4:
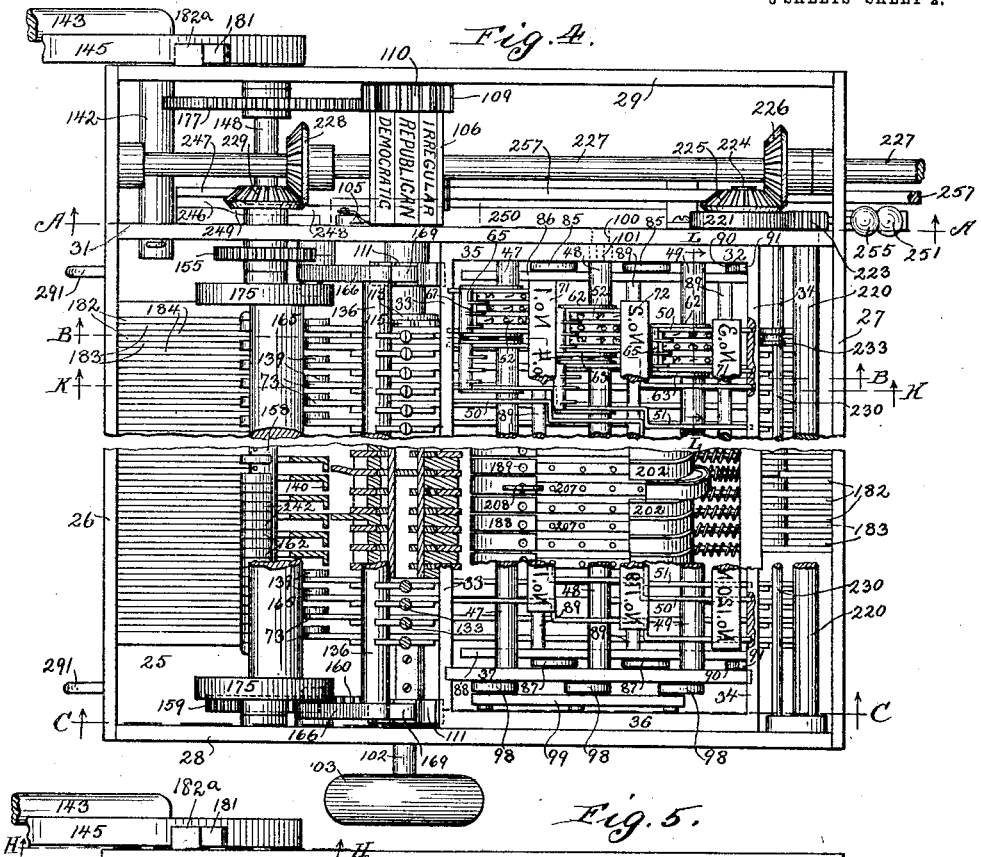
Figure 5:
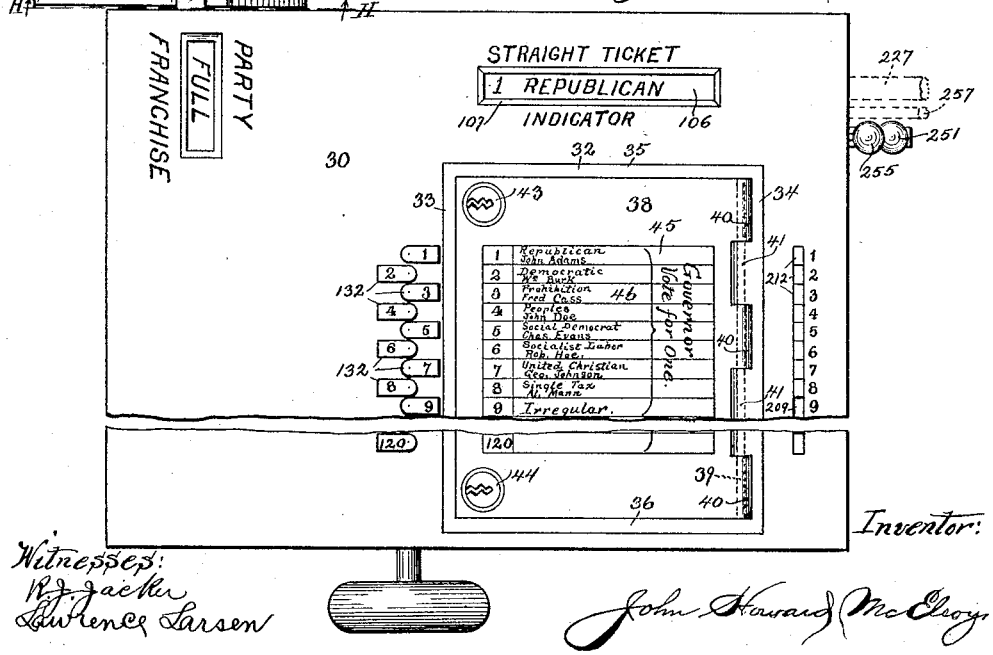
Figure 39:
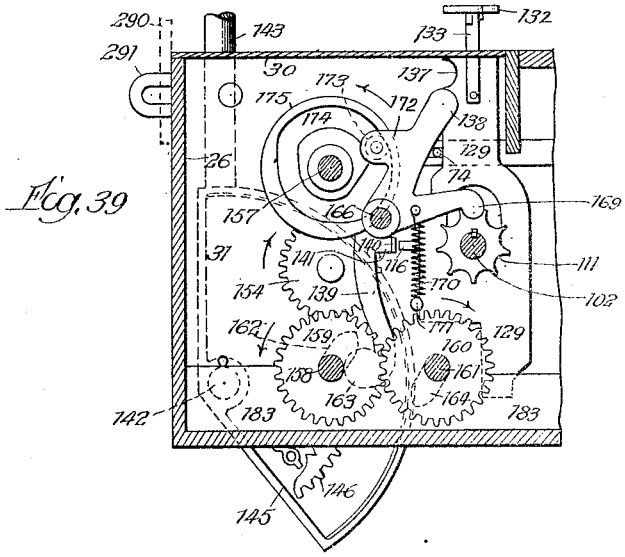
Figure 40:
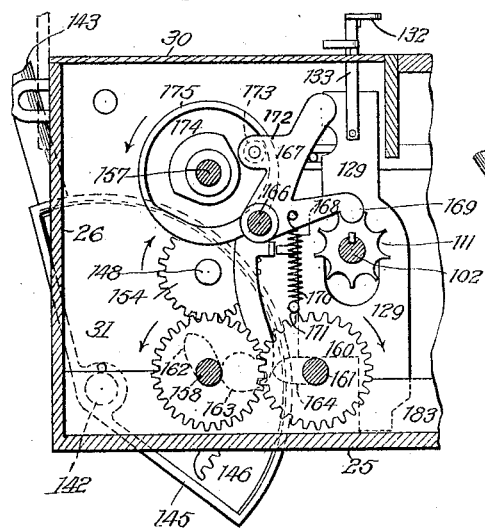
Figure 41:
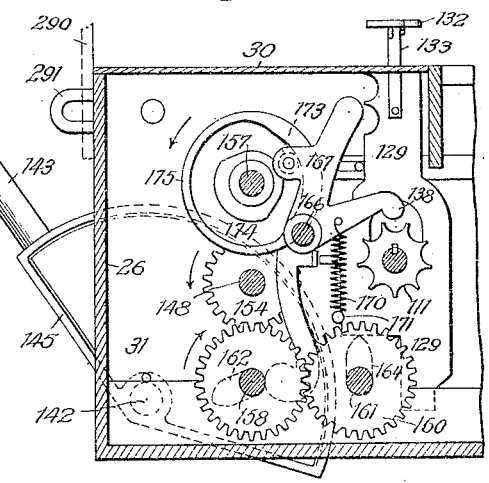

Referring to the accompanying sheets of drawings, in which the same reference characters are used to designate identical parts in all the figures, Figures 1, 2 and 3 are end elevations in section on the lines A—A, B—B, and C—C, respectively, of Fig. 4. Fig. 4 is a plan view in section on substantially the line D—D of Fig. 8, with the central portion of the machine broken away. Fig. 5 is a plan view of the machine with the central portion broken away, and with the names of the candidates arranged in alphabetical order in office groups in a single column, as required by the laws of some states. Fig. 6 is a plan view of the machine with the names of the candidates and their keys arranged in party columns and office rows, with the central portion of the machine broken away in two places, so as to show three different sections of the ballot sheet, in each of which the keys are arranged for a different number of party columns. Fig. 7 is an end elevation in section on the line E—E of Fig. 6. Fig. 8 is a side elevation in section on substantially the lines F—F of Fig. 1 and G—G of Fig. 2, and with a portion of the center of the machine broken away. Fig. 9 is an end elevation in section on the line H—H of Fig. 5. Fig. 10 is a detail in section on the line J—J of Fig. 6. Fig. 11 is a partial end elevation in section on substantially the line K—K of Fig. 4. Fig. 12 is a detail in section on the line L—L of Fig. 4. Fig. 13 is a partial detail of one of the movable supports for the key stop mechanism. Figs. 14–16 are details of the adjustable fulcrums for the key levers. Figs. 17–19 are details of the irregular balloting mechanism. Fig. 20 is an elevation of one of the adjustable straight ticket finger disks seen on the opposite side from that shown in Fig. 11. Fig. 21 is a plan view of the disk shown in Fig. 20. Fig. 22 is a side elevation of one of the separating disks used between the adjacent straight ticket finger disks of different office sections. Figs. 23 and 24 are a side elevation and a plan view, respectively, of one of the connecting disks between the adjacent straight ticket finger disks of the same office sections. Figs. 25 and 26 are front and side elevations, respectively, of one of the auxiliary straight ticket fingers to be used when more than one party nominates the same candidate for the same office; Figs. 27 and 28 are front and side elevations of the separating washers used between the units and tens, and tens and hundreds registering wheels; Fig. 29 is a perspective view of a cam lug; Fig. 30 is an end elevation of the machine, with the end of the casing removed, looking from the left of Figs. 1, 2 or 3, with the central portion broken out; Figs. 31, 32 and 33 are side elevations of the three different guide plates; Fig. 33ᵃ is a section through the straight-ticket shaft showing the ratchet and pawl to compel its rotation always in the same direction; Fig. 34 is a perspective view, shortened, and with some of the casing broken away and the registering wheels omitted, showing the mechanism for locking the wheels from movement when they are open for inspection; Figs. 35 and 36 are a top plan view and side elevation of a portion of the key stop mechanism, with the casings which partially surround the sprocket wheels removed; Figs. 37 and 38 are details showing the construction of the straight-ticket shaft; and Figs. 39, 40 and 41 are views similar to Fig. 3, but showing the parts in different positions. In the drawings, Figs. 1 to 9 are on one scale, while Figs. 10–29 are on a scale twice as large, and in Figs. 4 and 8 some of the candidate registers are omitted to obviate the labor of drawing so many of them.

My invention is intended to be used in either of the two classes of machines mentioned in the brief description of Figs. 5 and 6, and I have illustrated a machine which can be used interchangeably in either class by omitting, when used in the first class, the key board necessary to adapt it for the second class. I will first describe the machine as arranged in the first class, and finally as it is arranged for the second class.

The greater portion of the operating mechanism is placed in a box or casing consisting of the bottom 25, the sides 26 and 27, the ends 28 and 29, and the top 30, which parts may be secured together in any desired manner. I preferably place a partition 31 across the box near its upper end which serves to divide it into two compartments and also to furnish a support or bearing for the upper ends of some of the horizontal operating shafts. Of course it will be understood that the ends of the box are on the same level, and that when I say upper end, I mean that end which appears nearest to the tops of the sheets of drawings.

*The registers.*—The candidate registers are mounted in a rectangular frame 32, consisting of the sides 33 and 34, and its ends 35 and 36, and having the partition 37 across it near its lower end. The frame is open at its bottom, but has its top closed by a lid 38 hinged to its side 34, conveniently by means of a rod 39 passing through the intermeshing knuckles 40 and 41 secured to or formed integral with the lid and the side 34, respectively, as shown in Fig. 5, so that when the lid is closed its upper surface is flush with the upper edges of the sides and ends of the frame 32 into which it fits, and also with the upper surface of the top 30, into a suitable aperture in which the frame 32 fits, resting upon the projections 42 formed or secured on the inner sides of the end 28 and the partition 31 beneath the corners of the frame. The lid 38 is normally kept locked in its closed position by the locks 43 and 44 arranged at its ends and having bolts (not shown) coöperating with suitably located apertures (not shown) in the side 33. These locks preferably have different keys, one of which is in the possession of an election official of one party while the other is in the possession of an election official of another party, so that it cannot be opened surreptitiously by either of the officials. The frame 32 is preferably detachably secured in place in the casing, being normally held in place by locking mechanism (not shown) accessible through the lid 38. The central portion of the lid 38 is formed of a glass plate 45, on the under side of which is secured the ballot 46 which can be read through it, but is protected thereby. As will be seen the ballot has the names of the candidates arranged thereon in any necessary order, and the space for each candidate's name is preferably given a number corresponding to the number of the register devoted to that candidate.

With the mechanism I employ in which the keys are arranged as closely as possible to each other in a single row, in order to bring the wheels of each register side by side, it becomes necessary to separate the registers into different lines, and with this object in view, I provide the shafts 47, 48 and 49 which extend the length of the frame 32, and are preferably journaled in suitable bearings formed in the end 35 and partition 37, so that they can be rotated to simultaneously carry all the registering wheels to zero by the resetting mechanism to be described. The frame 32 has extending across it, several pairs of separating plates 50 and 51 through which the shafts 47, 48 and 49 pass, each of which, as is clearly shown in Fig. 4, has two offsets therein, which are necessary to permit of the registers 52 being located substantially in line with their respective keys and no others. As will be seen, the 1st, 4th, 7th, etc., registers are on the shaft 47; the 2nd, 5th, 8th, etc., registers are on the shaft 48 slightly beneath the 1st, 4th and 7th registers respectively; and the 3rd, 6th, 9th, etc., registers are on the shaft 49 a corresponding distance beneath the 2nd, 5th and 8th registers respectively, so that when an impression is taken from the registers, which preferably have type figures on their peripheries, the number of votes counted on each register will appear distinct from the others and practically opposite the name of the candidate to which it is devoted, if the names are previously printed on the tally sheet, as is preferable.

As best shown in Figs. 4, 11 and 12, strung on each shaft between each pair of separating plates 50 and 51 are three register wheels 53, 54 and 55 devoted to the units, tens and hundreds respectively. Each wheel has a portion of its periphery devoted to the 10 notched teeth 56, the units and tens wheels each having one deep notch for the customary deep-notch carrying mechanism. The rest of the periphery is devoted to the ten type figures 57 which are separated by the notches 58. For the reception of the resetting mechanism, each of the shafts 47, 48 and 49 has the deep, preferably rectangular, groove 59 therein, and between the wheels, 53 and 54, and 54 and 55, I place the washers 60 having the tongues 61 fitting into the groove 59 and preventing the washer from turning. One of the functions of these washers 60, which fit in correspondingly shaped recesses in the wheels, is to slightly separate the wheels so as to prevent the movement of one from accidentally carrying the adjacent wheel with it, which would destroy the accuracy of the count. Pivotally mounted on the shaft just outside of the plate 50 is an arm 62, and just outside of the plate 51 is a similar arm 63, the two being connected by a rod 64 upon which is loosely pivoted an actuating dog 65 having on its upper side the pawls 66, 67 and 68, set at different angles, as is customary in deep notch carrying registers, and adapted to coöperate with the teeth 56 on the wheels 53, 54 and 55, respectively, and on its under side a pendant 69, which, as seen in Fig. 11, tends to hold the pawls 66—68 in engagement with the teeth 56 by gravity, whose action may be reinforced by the customary spring if found desirable.

To prevent the possibility of any accidental backward movement of the wheels, I provide the spring detent pawls 70, which coöperate with the teeth 56, and which are conveniently secured to and supported by the bars 71, which are preferably substantially triangular in cross section and extend substantially the length of the frame 32, being secured to and supported by the series of separating plates 50 and 51. The primary function of these bars 71 however is to carry the type 72 by which the number of each register corresponding to the number of the candidate to which it is devoted is imprinted on the tally sheet adjacent the number of votes shown by said register. To swing the arms 62 and 63 from the position shown in Fig. 2 to the position shown in the left hand register in Fig. 11, and thereby advance the register one number, I provide a bar 73 for each register which is conveniently supported by the rods 74, 75 and 76 extending from the end 28 to the partition 31, and passing through the elongated apertures 77, 78 and 79 respectively, in the bar, which is guided by the notches 80 and 81 formed in the bottom of the sides 33 and 34 respectively of the frame 32. The bar 73 has a lug 82 thereon in a position which depends on which of the shafts 47, 48 and 49 the register which it actuates is located. The lug 82 takes into an elongated groove or slot 83 in the arm 84 projecting downward from and preferably integral with the arm 63, so that as the bar 73 is moved from the position of Fig. 2 to that of Fig. 11 the arm 63 and consequently the dog 65 will be swung about its register, so as to advance it in place.

After the polls are closed, the election officials unlock the lid 38, and swinging it up, the registers are exposed, and can be inked by a roller and an impression taken which will show the results of the election. To prevent any possible attempt to surreptitiously advance any of the registers while the lid is raised, I provide mechanism for locking the registers from any possible movement while the lid is opened, which is conveniently constructed as follows:

Pivoted to the inner side of the end 35 are the arms 85 which have pivoted to their lower ends the bar 86, whose right hand end normally rests by gravity against the side 34. The similar arms 87 are pivoted to the inner side of the partition 37 and have pivoted to their lower ends the bar 88, which is connected to the corresponding bar 86 by the three rods 89 which normally hang just out of engagement with the notches 58, so as not to interfere with the authorized movement of the wheels. Each of the bars 86 and 88 has a stud 90, which preferably takes the form of an antifriction roller, projecting from its outer side near its right hand end, and this engages with a pendant 91 pivoted to a stud 92 projecting downward from the lid 38 so that when the lid is raised from closed to open position the pendant 91 will be raised a certain distance. As seen in Fig. 3, when the lid is closed, the narrow neck of the pendant engages the roller 90, but as soon as the lid is raised a little the wider body 93 of the pendant which rests against the side 34 will cam the lug 90 and consequently the bars 86 and 88 to the left thus swinging the rods 89 into some one of the notches 58 of each of the registers so as to securely lock all of them from any possible movement while the lid is open and they are accessible. As soon as the lid is closed, the pendants 91 are forced back to their normal position and the bars 86 and 88 and the rods 89 can swing back out of engagement with the notches 58 leaving the registers unlocked.

By completely removing the frame 32 from the machine it will be seen that the registers could be reset one by one, but I preferably employ mechanism by which all of them can be reset simultaneously by the authorized officials. For this I may employ the mechanism best illustrated in Figs. 11 and 12, where it will be seen that I form a notch 94 with an abrupt shoulder on the inner periphery of each wheel and in the shafts 47, 48 and 49, I mount in rectangular sockets a spring pressed plunger 95 for each wheel which has on its outer end a tooth corresponding in shape to the notch 94. As the wheels are advanced from zero position the plungers 95 are forced backward into their notches. As the shafts are advanced in the same direction as the movement of the wheels, when the plungers reach the notches 94 the wheels are then carried forward and all stop at zero when the rotation of the shafts is completed. As shown in Fig. 12, the inner socket and one side of the outer sockets of the group of three sockets for each register is formed by the tongues of the washers 60, and the other sides are formed by the blocks 96 fitting in the groove 59 and secured in place by the screws 97.

While I might rotate each of the shafts 47, 48 and 49 separately, I preferably connect them so that all will rotate together, as by securing the crank arms 98 to the ends thereof and connecting them by the bar 99, as shown in Fig. 3. Power can be applied to these shafts to rotate them in any suitable way as by a key passed through the aperture 100, into the slot 101, in the shaft 48, as shown in dotted lines in Fig. 4.

*The straight ticket mechanism.*—As in the system of balloting carried out in my invention the bulk of the balloting is carried on by the straight ticket mechanism, I will describe that first; subsequently describing the individual candidate keys which are only employed when "scratching" is to be done, and are otherwise unactuated and unmoved.

The basis of my straight ticket mechanism is an adjustable member, preferably a rotatable cylinder, which, by movement to different positions, brings different sets of register operating or controlling members, as pins, into operative position so that different sets of registers, each set including those for all the candidates of that particular party, will be operated. If a cylinder is employed and arranged for nine different parties, it will have nine different angular positions, and in each position a different set of pins will be at the operative line, each individual pin on the cylinder having its own particular position in the line, so that the register, for the candidate to whom the pin is devoted can only be actuated by the straight ticket mechanism when the cylinder is in the angular position which brings its pin into the operative line. If the angular positions of the cylinder are equi-distant, and each party presents a candidate for each office, and the candidates are arranged regularly according to party in office groups, the position of the pins on the cylinder will be represented by a regular helical spiral, each spiral representing the candidates of the different parties for some one office.

Referring now to the drawings, especially Figs. 1-4, and 8, I provide a shaft 102, extending the length of the casing, journaled in suitable bearings in the ends 28 and 29 and the partition 31, and preferably projecting through the end 28 and provided with a hand wheel or knob 103, by which it can be turned in one direction to any of the nine different angular positions for which I have shown it as arranged. To prevent any possible breakage by turning the shaft 102 in the wrong direction, I secure to it just outside of the partition 31 a notched wheel 104 (see Fig. 8) with which a spring pressed pawl 105 pivoted to the partition coöperates in the customary manner to prevent its backward movement.

To indicate to the voter the exact position of the shaft, so that he will known how his vote is to be cast, I provide a straight ticket indicator 106 which consists of a cylinder journaled in suitable bearings in the end 29 and partition 31, and having its surface divided into nine equal spaces which are marked with the party names and which may have different colors to aid the illiterate voter, one space at a time being visible through a glass covered opening 107 formed in the top 30 just above the indicator. A gear pinion 108 secured to the shaft 102 next to the end 29 meshes with another gear pinion 109 mounted on a stud projecting from said end 29, which pinion in turn meshes with the gear pinion 110 of the same size as the pinion 108, secured on the indicator 106, so that as the shaft 102 is turned to any position, that position will be shown in the opening 107 by the indicator 106. I may place the indicator 106 in a position parallel to the shaft 102, as shown in Figs. 1, 4, 6 and 8, or I may arrange it at right angles thereto, as shown in Fig. 5, by the interposition of a pair of bevel gears.

The shaft 102 has rigidly secured thereon, preferably just inside of the end 28 and the partition 31, one or more positioning and locking disks, 111, which have as many equi-distant notches, preferably rounded, in their periphery as there are angular positions provided for; in this case nine. The mechanism coöperating with these disks will be described subsequently. The part of the shaft 102 extending between these disks 111 is preferably larger than the ends, and has a preferably rectangular longitudinal channel 112 formed therein, the shaft being arranged in any convenient manner so that the lower reduced end can be detached from the larger intermediate portion so as to give access to the channel to permit the placing of washers on the shaft which have portions projecting into the channel. A preferred construction for this purpose is indicated in Figs. 37 and 38. On the upper end of the shaft will be placed a washer 113 which has the rectangular tongue 114 fitting into and resting against the shoulder at the upper end of the channel 112 so as to be positioned thereby. Next to this washer 113 is placed a disk 115, which has a straight ticket finger 116 rigidly secured thereto and preferably formed integrally therewith, and is placed in such an angular position on the shaft that when the shaft is turned to such a position that the party to which the finger belongs is indicated at the sight aperture 107, the finger will be in a horizontal position and pointing away from the registers, as indicated in Fig. 2. This relative position on the shaft is maintained by a connecting disk 117 which has a lug 118 on the upper side thereof which fits into one of the nine equi-distant notches 119 formed on the inner periphery of the disk, depending upon the desired position of the finger 116 relative to the channel 112. The connecting disk 117 has a finger 120 projecting into the channel 112 and provided with a projection 121 thereon upon which is placed a short helically coiled expanding spring 122 which, co-acting against the finger 120 and one of the sides of the channel 112, serves to hold the connecting disk 117 and consequently the straight ticket finger disk 115 yieldingly in the position in which they are placed.

If it should happen that the candidate to which this particular finger disk 115 is devoted has been nominated by another party so that the corresponding register should also be actuated when the shaft 102 is in another angular position representing the second party, an auxiliary finger 123 is placed as indicated by dotted lines in Fig. 20 in one of the eight equi-distant radial channels 124, extending into the upper side of the disk 115, and is held therein by the lug 125 on its end extending into the corresponding notch 119. By this construction, and by the use of the auxiliary fingers 123, it will be seen that one register will do for a candidate that may have been nominated for the same office by any number of parties, and that whenever a straight ticket is cast for any one of those parties, a vote will be cast for that particular candidate. The disk 115 of the next candidate for the same office is now placed adjacent the connecting disk 117 and in the proper angular position so that its finger 116 will project horizontally to the left when the party name to which it belongs shows through the aperture 107, in which position the lug 126 on the bottom side of the connecting disk 117 will take into one of its notches 119. Another disk 117 is then added, and then another disk 115 in a different angular position, and so on, until enough disks 115 have been properly arranged to represent all the candidates for any particular office, or offices when a plurality of officials are to be elected, when after the last disk 115 is added, a washer 113 is used in place of the disk 117, and the section for another office is arranged in the same way, and so on until all the candidates are grouped according to the offices for which they were nominated. It will be seen that the connected disks 115 and 117 in each office group are in effect a sleeve, provided with the spirally arranged fingers 116, the sleeve being built up of disks in the manner shown as one method of facilitating the rearrangement of the machine for different elections. The lugs 118 and 126 on the connecting disks 117 fit snugly into the notches 119 of the disks 115, so that if pressure is applied to any disk in an office group to rotate it against the resistance of the springs 122, all of the other disks 115 in that office group are compelled to move with it. If it is desired to insure against any possible looseness of the lugs 118 and 126 in the notches 119, I may provide one or more bars 127 which are just the length of an office group between the washers 113, and are of a cross section to fit snugly in the notches 119, and the correspondingly shaped and located notches 128 in the connecting disks 117, through which notches the bars 127 extend. The interposition of the washers 113 between office groups prevents any possibility of any movement given to the disks 115 of one office group being accidentally imparted to another group.

*The candidate keys or scratching mechanism.*—At the same time that the disks 115 and 117 are strung on the shaft 102, I place thereon the blades 129 of the candidate keys of which there is one for each individual candidate nominated as well as an extra one in each office group for non-nominated or "irregular" candidates. These key blades 129 are preferably stamped up of sheet metal and have an aperture 130 therein just wide enough to embrace the washers 113 and connecting disks 117, each of which is within a key blade, and just long enough to permit the complete movement of the key into its operated and unoperated positions. Each key is provided with a scratched ticket finger 131, which in the unoperated position of the key, shown in full lines in Fig. 11, is above and out of possible contact with the operating mechanism. When a key blade is pushed down by pressure on the key button 132, secured on the top of the stem 133, which passes through a suitable aperture in the lid 30, and is secured in any convenient way to the key blade, the finger 131 is carried down to a position right in line with the straight ticket finger 116 which is at the operating point or line, so that the corresponding candidate register will be operated by reason of the finger 131 being in operative position. When a certain straight ticket is indicated by turning the shaft 102 to the necessary angular position, and any scratching is to be done, the key for the candidate in whose favor the party candidate is scratched, is pressed down, and it becomes necessary to construct the mechanism so that the operation of any candidate key in a party group will prevent the possible actuation of any register in the group by the straight ticket mechanism. For this purpose each key blade 129 is provided with a lug 134, preferably stamped inward from the body of the blade and in proper position to contact, toward the end of its downward movement, with one of the nine equi-distant ribs 135 extending across the periphery of the adjacent finger disk 115, so as to swing the disk and with it all the disks 115 and 117 of that office group into the position shown in Fig. 11, in which position any fingers 116 in the group that might have been in operative position are moved just out of operative position, so that only the register in the group corresponding to the scratching key that is depressed can be operated.

A locking member in the form of a rod 136 extending the length of the machine and operated by mechanism to be described co-operates with the correspondingly shaped notches 137 in all the operated keys and with the notches 138 of all the un-operated keys to force all the keys to their respective positions, despite any resistance that might be offered by the springs 122. As the lugs 134 only contact with the ribs 135 during the latter half of their downward movement, it is immaterial if the springs 122 should throw the key back, as might be the case in a large office group, if the combined resistances of these springs 122 exceeded that of the opposed springs (to be described) which yieldingly hold the rod 136 in its locking position. The springs 122 cannot return the key far enough so that its notch 137 is released from the rod 136, and at the time the registration takes place, the rod 136 is positively forced into its locking position by mechanism to be described so that there can be no failure of the keys to be in their proper operated position, and as the shaft 102 is also positively locked by mechanism coöperating with the disks 111, the springs 122 must yield and the straight ticket fingers of the group must be moved out of operative position during the actuation of the registers if a scratching key has been operated in that group.

*The actuating mechanism.*—Each of the actuating bars 73 has pivoted thereto at its left-hand end an actuating lever 139, which is normally in the position shown in Fig. 2, and hangs with the bearing surface or flange 140 formed on the end of the short arm 141, adjacent to and almost in contact with the outer end of its scratching ticket finger 131 if its scratching key is operated, or with the corresponding end of its straight ticket finger 116 if the shaft 102 is in proper position to bring its finger 116 to the operative line. If now power be applied by any suitable means to the left-hand side of the lower end of the lever 139 to swing it to the right, if either finger 116 or 131 be in position, the surface 140 will immediately contact with the end of said finger which thus becomes a fulcrum for the lever so that the further movement of the lower end of the lever under stress of the power causes its upper end to move in the opposite direction, the parts moving from the dotted line position of Fig. 11 to the full line position, thereby drawing the bar 73 to the left so as to advance the connected register one space. If neither finger 116 nor 131 be in place, the pivotal point of the lever still remains the fulcrum and it swings idly to the right as a lever of the 2nd class without any load other than its weight, instead of becoming a lever of the first class as it does when it operates a register. To swing all of these levers, as well as to reset the operative keys, I employ the following mechanism: Journaled in suitable bearings in the end 29 and partition 31 near the lower left-hand corner of the casing is a rock shaft 142 which has its out-side end turned up to form a rod 143 which when in a horizontal position is designed to prevent entrance to the machine, and which when in a vertical position permits entrance to it, but preferably keeps the keys and straight ticket mechanism locked from any movement until the voter has shut himself in the booth by lowering the rod to its horizontal position and preferably thereby concealing himself from the public by any desired form of a screen or door. As shown in Fig. 9, this shaft 142 has secured to it a segmental plate 144 embracing about 150 degrees and provided with an inwardly projecting flange 145 extending around the edge thereof and fitting close up to the outer side of the end 29. Projecting inwardly from this plate 144 is a segmental rack 146 whose teeth are in position to mesh with and rotate a gear pinion 147 secured on the outer end of a short shaft 148 journaled in suitable bearings in the end 29 and partition 31, as the plate 144 is moved from the open and locked position of the machine shown in dotted lines to the closed and unlocked position shown in full lines. To prevent any endeavor to beat the machine by moving the shaft 142 only partially, I preferably provide a complete stroke mechanism consisting of a series of teeth 149 on the under-side of the rack 146 which coöperate with the dog 150 pivotally mounted on a pintle 151 projecting from the end 29 of the casing. A coiled retractile spring 152 secured to the tail of said dog and to another pin 153 projecting from the end 29 serves to hold the dog 150 normally in the position shown, from which it is vibrated and operates in the customary manner to compel movement of the rod 142 in either direction when once it is started from either extreme position.

The shaft 148 has fastened to its inner end just inside of the partition 31 a gear wheel 154 which meshes with two gear wheels 155 and 156 of the same size located directly above and below it and secured to shafts 157 and 158 respectively which extend length-wise of the casing parallel to each other, and are journaled in suitable bearings in the end 28 and the partition 31. The shaft 158 has secured on its end just inside of the end 28 of the casing a gear wheel 159 which meshes with another gear wheel 160 of exactly the same size which is similarly secured upon a third shaft 161, which extends the length of the casing parallel to the shafts 157 and 158 and like them is journaled in suitable bearings in the end 28 and partition 31. With these connections it will be apparent that as the rod 143 is raised, the shafts 157, 158 and 161 will be rotated at the same angular speed in the directions indicated by the arrows in Fig. 2. The shaft 158 has formed on it a number of cam like or eccentric projections 162, of which there is one opposite the enlarged lower end 163 of each lever 139. The shaft 161 has a corresponding set of projections which are conveniently consolidated so as to form an eccentric portion 164 of the shaft shown in cross section which coöperates with the other side of the ends 163 of the levers 139. The shaft 157 has a similar eccentric or cam portion 165 which coöperates with the adjacent ends of the levers 139 and bars 73. The exact action of these eccentrics in coöperating with the levers 139 to actuate and return them as well as to reset the operated keys will be set out in connection with the locking mechanism in a description of the operation of the machine. The shaft 158 with the cams or eccentrics 162 thereon constitute a "register actuator" for all the registers selected for operation.

*The positioning and locking mechanism.*— Pivotally mounted on pintles projecting inwardly from the end 28 and the partition 31 are a pair of bifurcated arms 166, the upper forks 167 of which have secured between their ends the previously mentioned rod or bar 136, while the lower forks 168 have on their ends the downwardly projecting lugs 169 which are properly shaped to fit snugly into some one of the nine equidistant notches in the locking disks 111 on the shaft 102.

Coiled retractile springs 170 secured to the arms 168 and to pins 171 projecting inwardly from the end 28 and partition 31 may be used to aid gravity in holding the lugs 169 and the bar 136 yieldingly in their respective notches. The forks 167 have the offsets 172 thereon which carry the projections 173, which preferably take the form of anti-friction rollers, and fit into the cam grooves 174 formed on the outer faces of the cam disks 175 secured to the shaft 157 near its ends.

By reference to Fig. 3, which shows the parts in the relative positions they occupy when the rod 143 is down, and the machine is ready to be operated, it will be seen that the rollers 173 are in the wide portion of the grooves 174 so that if the handle 103 is turned, the lugs 169 can be forced out of the notches in the disks 111 against the resistance of the springs 170, which however, tend to exactly position the shaft 102 in the angular position representing the party chosen. If any scratching is to be done, the proper keys will be pressed in, and the yielding action of the bar 136 upon the notches 137 and 138 will tend to accurately position the keys either in their operated or unoperated position, so that if the voter fails to push a key in far enough, it will be returned before his eyes showing him his failure, while if he pushes it past the center it will be carried down the rest of the way, but can be freely retracted if he should by accident operate the wrong key. The straight ticket mechanism, if used, must be set first, but no harm is done if the voter should attempt to do his scratching first, as when he did turn the shaft 102, the ribs 135 contacting with the lugs 134 on the operated keys would simply cam the keys upward toward their inoperative position, which would attract the attention of the voter and he could then re-scratch his ballot. If desired, I might arrange it so that the movement of the straight ticket mechanism would not reset the scratching keys as all that would be necessary would be to shorten the radial length of the ribs 135 so that they would not be long enough to cam the operative keys back past the center as the shaft 102 was rotated, and when the rotation ceased, the bar 136 would carry them back to their operated position again.

As the rod 143 is raised by the voter in leaving the booth after the machine is set, the shafts 157, 158 and 161 are rotated in the directions shown by the arrows in Fig. 2. During the first 60 degrees of movement the rotation of the shaft 161 carries the eccentric portion 164 away from the bottoms 163 of the levers 139, so that they are free to be swung to the right when the eccentric lugs 162 of the shaft 158 get far enough around to do this, which however is not until after the first 60 degrees of rotation. During this time the rotation of the shaft 157 has carried the eccentric portion 165 away from the upper ends of the levers 139 so that they are free to have those ends swing to the left if their bearing faces 140 come in contact with either of the fingers 116 or 131 as their lower ends are swung to the right by the eccentrics 162. During this movement the cam disks 175 are carried forward so that the rollers 173 are in that portion of the grooves 174 that has the greatest radial distance and is just enough wider than the diameter of the roller to permit it to move freely, so that the rod 136 is locked in the recesses 137 or 138, as the case may be, of the keys so that they are absolutely locked exactly in their operated or un-operated position during the next 120 degrees of rotation, during which time the levers 139 are swung forward, operating such registers as the arrangement of the straight ticket and scratching mechanisms provides for. At the same time that the keys are locked the lugs 169 coöperating with the notches in the disks 111 exactly position the shaft 102 and absolutely lock it from movement while the registers are being actuated. During the next 60 degrees of movement, that is from 180 degrees to 240 degrees from its starting point, the rotation of the cam disks 175 causes the rollers 173 to be carried from the portion of the grooves 174 having the greatest radial distances to that having the least radial distance, in which portion the arms 167 and 168 are rocked backward, as indicated in dotted lines in Fig. 3, until the rod 136 is out of engagement with the notches 137 and 138, and the lugs 169 are out of engagement with the disks 111, in which position they are locked during substantially all of the remaining 120 degrees of movement necessary to make a complete rotation of the shafts, so that during the last 120 degrees, the keys can be reset and the straight ticket mechanism returned to the normal position to destroy any indication to the next voter of how his predecessor voted, without any unnecessary friction or resistance of the parts.

During the last ⅓ of this complete rotation, the eccentrics 165 will cam the upper ends of the levers 139 and the bars 73 back to normal position ready for another operation. At the same time the eccentric 164 cooperating with the bottom edges 176 of the operated key blades 129 will cam them up to unoperated position, and during the latter portion of its movement will contact with the ends 163 of the levers 139 and carry them back to normal position if they are not so accurately balanced that they will swing back to that position by gravity. During the latter third of the rotation, the shaft 102 is rotated back to a normal or neutral position by the following mechanism:

Secured upon the shaft 148 just inside of the end 29 is a disk 177 having on a portion of its periphery just enough teeth 178 to give a complete rotation to the gear pinion 108, with the inner half of which it is adapted to mesh. Of course it will be understood that instead of using a complete disk, I might use a toothed segment. These teeth 178 are so located upon the disk 177 as to engage the pinion 108 only during the last third of the rotation of the shaft 148, and as will be seen in Fig. 4, engage only the inner half of the gear pinion 108 if it may be supposed to be divided vertically. This inner half of the pinion is mutilated by having two of its teeth removed, as seen at 179 in Fig. 1, and when the indicator and shaft 102 are at their neutral or chosen normal position, the mutilated portion of the pinion is in line with the teeth 178, so that the rotation of the disk 177 does not affect it. If the shaft has been moved out of normal position, the teeth 178 engaging with the pinion 108 will move it until they reach the mutilated portion when the meshing ceasing, the indicator and shaft will stop in that position, thus effectually destroying the straight ticket indication to the voter.

While the rod 142 is up and the booth is open, I prefer to have the keys locked from manipulation, and for this purpose I simply utilize the locking mechanism already provided by arranging it so that when the arm is up, the cam disk 175 shall be in such a position that the rollers 173 shall be in that part of the cam groove 174 having the greatest radial distance, in which position, as will be remembered, the rod 136 locks the keys from movement. To bring the parts to this position when the rod 142 is up I simply make the number of teeth in the rack 146 sufficient to give the pinion 147 and the shaft 148 a rotation of somewhere between 420 degrees and 560 degrees as the rod 142 is raised and lowered, the extra rotation of the parts beyond 360 degrees doing no harm as all the parts are reset when the 360 degrees of rotation is completed. To limit the movement of the rod 142 to the 90 degrees of movement and determine its position at the extremes thereof, I conveniently provide the stop lugs 180 and 181 at the necessary points on the curved portion of the flange 145, and form or secure the cooperating lug 182$^a$ on the outer side of the end 29 of the casing. When the rod 142 is lowered by the voter after he enters the booth, the parts are rotated back to the position shown in Figs. 2 and 3. In Fig. 39, I have illustrated the position the parts assume when the rod 143 is raised to a vertical position so that the booth is open, and the arrows added to the figure show the directions the various shafts will rotate when the booth-closing movement of the arm 143 is started. In this position, it will be seen that the keys are locked from movement. In Fig. 40, I have illustrated the position the parts assume after the arm 143 has moved down far enough to turn the shafts 148, 157, 158 and 161 through sixty degrees, and in this position, it will be noted that the shafts are in just the same position as they are when the booth is closed, and that any key can be operated by pushing it down, as they are then unlocked. Supposing that the voter should attempt to manipulate the keys by pressing them down when they are in this position, it will be seen that the further movement of the rod 143, say, to the position shown in Fig. 41, will immediately serve to re-set the keys that have been pushed down, and this resetting occurs without there being any possibility of the levers 139 being moved to actuate the registers, so that the keys are re-set near the beginning of the booth-closing movement, if they should have been operated at any time prior to the intended operation of the keys when the booth is entirely closed.

*The key stop mechanism.*—In order to prevent the actuation of the registers for more candidates for the offices than are to be elected, I provide the novel key stop mechanism shown in Figs. 2 to 4, 8, 11 and 13. The base of the machine is covered by a set of guides, which, however constructed, may be conveniently considered as made up of three sets of guide plates 182, 183, and 184, arranged across the machine in regular order, and of the shapes to be described. All of them have semi-circles, or at least parts of semi-circles cut out in the left hand end to accommodate the rotation of the eccentric lugs 162 and eccentric bar 164, as clearly seen in Figs. 2 and 11. The plates 182, which are directly underneath the levers 139, extend across the machine, and have the spurs 185 formed on the other plates between the semi-circular notches cut away, as indicated by the dotted lines at 186 in Figs. 2 and 11, so as to permit the end 163 of the lever 139 to swing between said spurs on the plates 183 and 184 as guides to prevent any possible side-wise movement of the lever 139 and consequent movement of the bearing surfaces 140 out of exact register with the ends of the fingers 116 and 131. Just beyond the key blade 129, the plate 182 has projecting upward therefrom, and preferably formed integrally therewith, a shield 187 which has formed on the left hand edge and top thereof the substantially semi-circular flange 188, with an aperture 189, preferably screw threaded, therein. The plate 183 is directly beneath the bar 73 and is shaped just like the plate 182, except that the spur 185 is not cut off, and it does not have the shield 187. Both of the plates 182 and 183 have a somewhat elongated cut away portion, as indicated at 190. The plate 184 is like the plate 183 except that it is cut off at 191, so that at the center and the right hand side of the machine, there shall be a space to receive the lower end of the key blade 129 and the sliding support 192. The key blade 129 has a short off set vertical edge 193 at its bottom which when the key is un-operated, has resting against it the preferably rounded end 194 of the support 192, which may be yieldingly held there by the helically coiled expanding spring 195 surrounding a pin 196, extending horizontally from the other or right hand end of the support and passing through an aperture 197 formed in a bar 198 extending across the machine and seated in the rectangular recesses 199 formed in the plates 182 and 183 in the cut-away portions 190. The spring 195 is confined between the end of the support 192 and the bar 198, and is intended to be just strong enough to overcome the inertia of the parts and return the support 192 to normal position as the key is raised.

When it is depressed, the inclined surface 200 coöperating with the rounded end 194 cams the support 192 to the right until the inclined surface is past, after which the tendency of the pressure of the end 194 against the vertical side of the key is to hold the key in its operated position. The support 192 has upon its right hand end a shield 201 similar to the shield 187, except that it is reversed in position, and is slightly inclined as shown in Fig. 8. It has a guard flange 202, and centrally located therein is the bearing stud 203, shown in section in Figs. 11 and 13, on which is mounted the sprocket wheel 204, which is of a size such that its teeth are close to the inner edge of the flange 202, so as to hold the coöperating tape or chain from accidental dis-engagement therewith. The shields 187 might each have a central bearing stud like 203, but I prefer to form each with a circular aperture (not shown) through which passes a rod 205 extending the length of the machine and forming the bearing for the sprocket wheels 206 which are just like the wheels 204. As will be seen from Figs. 4 and 8, the incline given to the shield 201 serves to bring the top of a wheel 204 in line with the top of one wheel 206, and its bottom in line with the bottom of the next wheel 206, and so on, so that the sprocket tape or chain 207 passes from one wheel 206 to and around the opposite wheel 204, thence back to the next wheel 206, and so on without any lateral bending of the tape or chain, but only with a slight twist.

To arrange this key stop mechanism for different groups, the adjustment is as follows: When the key stop mechanism is assembled, the tape 207, which is of thin flexible steel and has perforations therein coöperating with the teeth of the sprocket wheels 204 and 206, is strung loosely upon the wheels, so that when the chain is tautened up, it will be considerably longer than is necessary to extend around all the wheels. In the aperture 189 of the upper-most shield 187 is secured a key 208 which has an aperture in its end which is adapted to take over one of the teeth of the sprocket wheel 204 so that the key can be screwed down upon the tape 207, thereby locking the wheel from rotation and clamping the tape at one end. As many of the scratching keys are now pushed fully in as there are offices to be filled in the group, which ordinarily requires one key to be operated. The tape is now drawn taut over the various wheels 204 and 206 throughout that group, and another key 208 is screwed into the aperture 189 of the last shield 187 in the group. With this adjustment, it will be apparent that only so many scratching keys as are provided in each group can be operated at one time, as the movement of that number of supports to the right and the consequent translation of the wheels 204 takes up all the slack in the tape, and no more can be operated without returning some of those previously operated. All the wheels in the group, except the two end wheels 206 are free to rotate, so that the tape adjusts itself automatically and with little friction. When the keys are released, the springs 195 return the supports 192 to their normal position, although this is not necessary, as the springs might be dispensed with and the supports 192 be allowed to remain in their advanced position until the next operation of the machine when they would be retracted by the operation of the keys. After the first group is completed, the succeeding groups are formed in the same way, each group embracing as many candidates as are nominated for the same office, and being arranged to permit of the operation of only as many keys as there are officials to be elected to that office. It will be seen that this system adapts itself readily to multi-candidate groups of any size, as the tape cannot be stretched and does not wear so that over operation becomes possible. Of course it will be understood that in the multi-official groups if any scratching is done, the keys for each of the candidates voted for in the group must be operated, as the operation of one scratching key throws all the straight ticket mechanism in that group out of operative position. It will be apparent that by using a long enough tape 207 and supplying a sufficient quantity of the keys 208, any grouping whatever that may be desired can be made.

*The free balloting mechanism.*—To provide for voting for non-nominated or irregular candidates, I employ the following mechanism, which is best shown in Figs. 1 to 5, 8, 10, and 17 to 19. Extending the length of the key-board in the top 30 is a slot 209, and the channel formed thereby is continued by securing on the under side of the top between the side 27 of the casing and the side 34 of the frame 32 the angle bars 210 and 211, their vertical flanges being separated, as shown, only a slight distance. This channel is filled up, except directly opposite the irregular candidate keys by a series of plugs or strips 212, each of which is of a breadth equal to the distance between the keys, and of a thickness sufficient to fill the channel, and is preferably secured in place by a set screw 213 passing through suitable apertures therein and in the vertical flanges of the angle bars 210 and 211. A supply of irregular ballots 214, preferably made of card-board and shown in Fig. 10, are provided, each of which is of a breadth and thickness slightly less than those of the passage way formed between the strips 212, and angle bars 210 and 211, and long enough to write a name and residence thereon. Having written the name and residence of the candidate upon the strip, the irregular key for that party group is operated and the ballot is inserted either before or after the operation of the key. The ballot can only pass down until it strikes on the top of the bar 73, whose right hand end extends just a little beyond the vertical flange of the angle bar 211. When the machine is operated as the voter leaves the booth, the movement of the bar 73 to the left leaves the ballot unsupported and I might allow it to fall by gravity into the corresponding compartment in a trough like receptacle 215, preferably provided with adjustable transverse partitions 216, which can be placed in any one of the vertical grooves 217 formed on the inner faces of the sides 218 and 219 of the receptacle. This receptacle 215 is of a shape to be supported by the ends of the bars 182 and 183 and occupies the position shown in Figs. 2 and 3, whence it can be withdrawn after the balloting is over through a suitable door (not shown) in the end 28, and the irregular ballots counted.

Instead of depending upon gravity to carry the irregular ballot through the channel, I prefer to employ positive mechanism, which I construct as follows: Journaled in suitable bearings in the end 28 and partition 31, in the position shown in Figs. 2 and 3, is a small roller shaft 220, which is preferably faced with rubber and is given one or more rotations toward the end of the operation of the machine, by a mutilated gear wheel or segment 221 whose peripheral teeth 222 mesh with the teeth of a gear pinion 223 secured to said roller shaft just inside the upper compartment. To rotate this gear wheel 221, which is journaled upon a pintle 224 projecting from the face of the partition 31, I secure to it, or form integral therewith, a bevel gear pinion 225 which meshes with a similar sized bevel gear pinion 226 suitably secured upon a horizontal shaft 227 journaled to rotate in suitable bearings formed in the sides 26 and 27, and which has secured upon it another similar bevel gear pinion 228 meshing with a bevel gear pinion 229 secured upon the upper end of the shaft 157. To coöperate with the roller 220 to carry the ballot 214 through the passage way, I provide the following mechanism: Parallel to the shaft 220 is a bearing rod 230 extending between and supported by the ends 28 and partition 31. On this rod for each irregular candidate key, or for all keys if desired, I pivot a short supporting lever 231. This has journaled in an aperture 232 in its upper end a roller 233 formed of two disks journaled and united in the manner clearly shown in Figs. 17 and 18, where Fig. 17 is a side elevation of one roller having the bearing stud 234 preferably formed integral therewith and terminating in the screw threaded end 235 upon which the other disk is screwed, abutting against the shoulder 236 so that the roller cannot bind upon the supporting lever. The lower end of the lever 231 is in the form of a rounded lug 237, which fits in a pocket 238 formed on the side of the bar 73, preferably by originally forming an extension on the under side of the bar 73 and bending it up. A horizontal web 239, shown in dotted lines in Fig. 10, connects the side 240, of the pocket with the bar 73, and is in such a position that when the bar 73 is moved to the left before the roller shaft 220 begins to rotate, the preferably curved end 241 of the web 239 contacts with the lug 237 and swings the lever 231 from the position shown in Figs. 2 and 3 to that shown in Fig. 10, where it is held firmly against the ballot 214, which in turn is held firmly against the roller 220, so that when it rotates the roller 233 is also rotated and between them the ballot is positively carried down through the passage way and dropped into the proper compartment of the receptacle 215. The lug 237 rides upon the web 239 so that it is firmly locked there until the bar 73 is returned, when the inwardly turned lug 242ª from the top of the side 240 contacts with the lug 237 after it is released from the web 239 and swings the lever 231 and the roller 233 back to in-operative position where they remain until that irregular key is operated again.

*The limited franchise mechanism.*—In some States there are two or more classes of voters having different franchises to be exercised at the same election. For instance, in the State of Illinois, the women are allowed to vote for the trustees of the State University, which are voted for at the presidential and congressional election. To arrange the machine so that both the male or female voter can operate it, without either exercising more than his lawful franchise, I provide a novel structure in which the mechanism can be shifted into different relative positions by the judges or other election officials, so that when one kind of a voter uses the machine, only the registers of the offices for which he is entitled to vote will be operated, no matter how many keys he may set for offices out-side of his franchise. To effect this result with the mechanism already described, I preferably arrange the operating shaft 158 so that it can be shifted longitudinally so as to carry the lugs 162 either into or out of register with the ends 163 of the actuating levers 139. When it is to be used for voters having a full franchise, it is left in position so that a lug 162 is opposite each end 163, so that all of the levers 139 will be swung to register the voter's choice of all the candidates for the different offices. When it is used for a limited franchise voter, the shaft is shifted longitudinally so that the lugs 162 are out of register with the ends 163. To operate the registers of such candidates as the limited franchise voter is entitled to vote for, I secure auxiliary lugs 242 between the lugs 162, as shown at the lower end of Fig. 4, so that in the limited franchise position of the shaft 158, one of these lugs 242 will be opposite the ends 163 of the operating levers 139 of all the candidates for which the limited franchise voter is entitled to vote. These auxiliary lugs 242, one of which is shown in Fig. 29, are just like the lugs 162, and their inner concave ends are the lugs 162 and have centrally disposed designed to fit upon the shaft 158 between apertures therein into which are screwed the ends of screws 243 (shown in dotted lines in Fig. 11), the bodies of which extend through the holes 244 formed through the shaft 158 between each adjacent lug 162, so that the lugs 242 can be placed in any position that may be necessary in the groups of the candidates. It will be apparent that this system can be applied to more than two classes of voters by increasing correspondingly the number of positions of the shaft 158 and also of the sets of lugs. As it may be applied to two classes having such different franchises that one class can vote for certain candidates that the other cannot, and vice versa, the lugs 162 are also made movable and adjustable, just like the lugs 242, otherwise they might be integral with the shaft 158, but the principle of operation will be the same in either construction. To conveniently adjust the shaft 158 in either of these two positions from the out-side of the casing, I employ the following mechanism: The shaft 158 is capable of a slight longitudinal movement in its bearings, the gear wheels 156 and 159 on its ends being broad enough to keep in mesh with their cooperating gear wheels 154 and 160 respectively in either position, or they might be splined on the shaft so that they would turn with it, but it could be adjusted longitudinally without shifting them. It has on its upper end within the upper compartment a collar or disk 245, which in one position rotates in one end portion 246 of a groove formed in the top of a sliding block 247, while in the other position it rotates in the other end portion 248 of the groove, the two end portions being at different distances from the partition 31, and connected by the inclined portion 249 so that as the block 247 is shifted from the full line position of Fig. 1 to the dotted line position, and vice versa, the groove acting on the disk 245 will carry it and the shaft 158 into one or the other position, as the case may be. The block 247 is connected to a bar 250 sliding in suitable ways, and passing out through an aperture in the side 27 of the casing and provided with a handle 251 by which it can be manipulated. It is conveniently locked in either position of adjustment by a spring pressed plunger 252 mounted in suitable bearings inside of the casing and coöperating with one of the notches 253 and 254 on the bar 250, depending upon the position. A handle 255 attached to the plunger and extending through a slotted opening in the casing serves to raise the plunger to release the bar to set it in either position. Of course it will be understood that the bar 250 is not accessible to the voter when he is in the booth, as the side 27 is expected to be on the outside of the booth. The position of the handle 251 will serve as an indicator to the by-standers as to the kind of a franchise given by the election officials to the voter so as to prevent any collusion between the official and a limited franchise voter. Of course the full franchise voter is protected to some extent by reason of the election officials being of different parties, but I preferably add an indicator operated by the bar 250, and in sight of the voter, so that he can see what franchise he is given.

Referring to Figs. 1 and 5, it will be seen that I journal in suitable bearings in the end 29 and partition 31 an indicating drum 293 (omitted in Fig. 4 to disclose the parts beneath it) which has a disk 294 secured to its lower end. A belt or rope 295 is secured at one point, as by the pin 296 to this disk. One end of the belt has a weight 297 secured thereto, and the other end passes downward around the shaft 142, which serves as a pulley, and is secured to the end of the block 247, as clearly shown. When the parts are in full line position of Fig. 1, the portion of the arm 293 which is exposed through the glass covered aperture 298 has marked thereon "Full," "Complete," or some similar word which read in connection with the word "Franchise" on the top 30 adjacent the aperture indicates to the voter what franchise he is given. When the mechanism is shifted to the dotted line position, another portion of the drum 293 is exposed and this has upon it "Partial" "Womans" or some such phrase to designate the particular kind of franchise in that position. The weight 297, or an equivalent spring, serves to return the indicating drum to its normal position.

In some States it is provided that the various parties shall hold their primary elections on the same day, all voters using the same blanket ballot and each indicating thereon his choice of the candidates for the different offices presented by his own party, and no others. By the use of my limited or varying franchise mechanism, it will be seen that the machine can be readily adapted for these primary elections by arranging the actuating lugs on the shaft 158 for the different parties so that when a Democratic voter is in the machine only the levers 139 for the Democratic candidates will be swung, so that he cannot interfere with the Republican primary which is being conducted in the same machine. For such a use of the machine, each party will have a number of groups according to the number of offices and each group will contain all the candidates of that party for that particular office, and the lugs 162 on the shaft 158 will be arranged to co-act with the levers 139 on the groups of that party only when the franchise controlling mechanism is adjusted for that particular party. By this arrangement, the machine can be used for primaries in this way, and I am not aware of any other system of a machine that can be so used. In such a use of the machine the straight ticket mechanism will not ordinarily be employed, although it will be apparent that it might be employed, each position thereof representing some particular faction of the main parties.

*Grouping a plurality of machines.*—Instead of making each machine large enough so that it will have enough registers to accommodate the largest number of candidates ever voted for at any elections, such as the presidential, State and county elections occurring every four years in Chicago, with the nine parties sometimes in the field, requiring 400 or 500 registers, I preferably make a unit machine that shall have, say 120 registers, which is ordinarily large enough to accommodate all elections except the presidential election. When a presidential election occurs as many machines of the kind shown as may be needed may be placed side by side coupled up by the following mechanism: The straight ticket shaft 102 has in the small compartment of the casing an eccentric portion 256, and if a plurality of machines are to be grouped, a bar 257 with a corresponding number of eyes 258 embracing the eccentric portion 256 is extended throughout all the machines, which in that case will be provided with elongated apertures in their sides, through which the bar 257 can move. By these connections the straight ticket shafts 102 in all the machines will be rotated simultaneously to the same extent. To operate all the free balloting mechanisms, a single shaft 227 may be extended through the entire series of machines, or the shafts of the several machines may be coupled together in any desired manner, thus dispensing with the gears 228 and 229 in all but one of the machines. The bar 250 can be extended throughout all the machines, and the blocks 247 fastened in as many of them as may be necessary to meet the different franchise requirements.

*The party column and office row key-board.*—To adapt the machine previously described for those States where the ballot is printed or arranged in party columns and office rows, I add the key-board shown in Figs. 6 to 8, 10, and 14 to 16. So far as I am aware, this is the first adjustable key-board for this kind of a ballot that has ever been devised, and while I have shown it as applied to the particular machine, it will be understood that it can be applied by the necessary modifications, to all voting machines.

As shown in Fig. 11, the key button 132 has a lug 258, semi-circular in cross section, projecting downwardly from it and resting in the complementary notch 259 cut in the top of the key stem 133. A screw 260 passing through an aperture 261 in the stem is screwed into the lug 258 holding the button in place. When the key-board is to be added, the key buttons are removed.

The key-board is a rectangular casing consisting of the sides 262 and 263, the upper end 264, the lower end 264ᵃ, the top 265 and the partition 266 parallel thereto and removably secured between the ends and sides of the casing. The top 265 and the partition 266 are provided with preferably circular apertures 267 and 268 respectively arranged in rows extending length-wise and across the machine, each length-wise row having as many apertures in it as there are key stems in the machine and spaced apart the same distance. There are as many lengthwise rows as there are parties, including the irregular candidates, to be provided for—in this case nine—and the central one corresponds in position with the row of key stems, so that there is an aperture 267 and 268 over each key stem 133, and these apertures are conveniently the size of the key stems. I provide a number of push keys having the heads 269 and the elongated stems 270 adapted to pass through the apertures 267 and 268. The stems 270 have slots 271 cut in them extending from the bottom upward half their length and ending over the corresponding key lever 272 of the second class at a point depending upon what lengthwise row the key is in. A cotter pin 273 is passed through the stem 270 beneath the lever 272 after it is put in place so that if a key is pulled back by the voter to reset it, it will raise the lever 272 to reset the key stem 133 to which the key is connected. The lever 272 has at one end an aperture 274 (shown in the dotted lines in Fig. 15) which fits over the bearing stud 275 of a fulcrum post 276, which, as shown in Figs. 14 to 16, is, for convenience of assembling, made of two halves 277 and 278, each half having the reduced ends and the central recess 279, and one half has the bearing stud 275, preferably formed integral therewith, so that when the parts are assembled, the reduced ends of the fulcrum post fit in one pair of the apertures 267 and 268 of one of the outside lengthwise rows. The central portions of the levers 272 pass through an aperture 280 formed in the key stem extension 281 which extends from the under side of the top 265 down through the aperture 268 over the key stem 133 to which it is attached by means of a pin 282 projecting from the center of the recess 283, which is complementary to the notch 259, and extending into the aperture 261 of the key stem 133. By this connection it will be seen that all the extensions 281 and the key stems 133 can be instantly connected or disconnected by moving the casing side ways. Such keys as are in the center row do not need the levers 272, fulcrum posts 276 and extensions 281, but have heads or buttons 284, and stems, not shown which are not slotted as the stems 270 are, and have their lower ends constructed exactly as those of the extensions 281 are, so that they can be connected to and disconnected from the key stems 133 in the same way. The mode of operation of these keys to move the key stems 133 will be apparent. The method of grouping them for different number of parties, shown in Fig. 6, is as follows:

Where nine parties, including the irregulars, are in the field, the arrangement is as shown at the top of the figure, the position of the levers 272 being indicated by dotted lines and it will be seen that they lie parallel to each other and have their fulcrum posts 276 at the opposite side of the center line from that of their keys. If eight, seven or six parties are in the field, the same relative arrangement is used excepting that one, two or three lengthwise party rows will be omitted on one side of the center line, which ever is the most convenient. Where five parties are in the field, I use the relative arrangement shown in the central portion of the figure, where the keys are twice as far apart across the machine, but only half as far apart lengthwise thereof, and the angle of the key levers 272 is not so great. If four parties are to be provided for, I use the latter arrangement, omitting one row. If three parties are to be provided for, I use the arrangement at the bottom of the figure, in which the keys are four times as far apart across the machine, and 1/4 lengthwise, as in the first arrangement. In each election of course there will be a special printed ballot 286, which is preferably made of heavy paper and covered with celluloid or some similar transparent material, in which apertures are provided in the necessary places for each of the key stems 270 and 285. The face of the ballot will be divided up into candidate spaces, and in the arrangement shown in the upper portion, the names are more conveniently printed lengthwise of the machine, while in the other arrangement they are more symmetrically printed across the machine. It will be apparent that by my invention I have produced something that is so far as I am aware entirely novel, i. e., a voting machine in which the ballot can be arranged for any special election in any desired number of columns and office rows without altering the construction of the machine.

As it is necessary to remove the key casing at the close of an election to get at the lid 38, I conveniently provide for this by bolting sockets 287, having apertures 288, shown in dotted lines in Fig. 10, upon the top 30. I provide projections 289, shown in dotted lines in Figs. 6, 7, and 10, upon the bottom, of the side 263 of the casing adapted to slide into the apertures 288. On the opposite side 262, I secure slotted tongues 290, which, when the projections 289 are shoved into the apertures 288 take over the staples 291 projecting from the top of the side 26. A plurality of these tongues 290 and staples 291 are preferably employed, and when the casing is in place, the padlocks 292, preferably having different keys to be held by members of different parties, are inserted through the staples 291 and locked so to prevent the casing being moved or removed. When the casing is slid into place, the pins 282 of the key stem extensions 281, and the stems 285, take into the apertures 261 of all the key stems 133, coupling them for operation.

It will be noted that the elements 129, which I have primarily designated as "blades," to which the keys 132 are rigidly connected through the medium of the stems 133, as seen in Figs. 2 to 5, or to which the keys 269 are indirectly connected through the medium of the rods 270, levers 272, and the extensions 281 of the stems 133, as seen in Figs. 6 to 8, have a primary function of actuating the interlocking elements 192 by the cams 200, so that said elements 129 are "interlock operating members." These blades 129, together with the interlocking elements 192 and associated elements, constitute "interlocking mechanism."

While I have shown my invention as embodied in the form which I at present consider best adapted to carry out its purposes, it will be understood that it is capable of modifications in form and structure, and that I do not desire to be limited in the interpretation of the following claims except as may be necessitated by the state of the prior art.

What I claim as new, and desire to secure by Letters Patent of the United States is:

1. In a voting machine, the combination with candidate registers arranged in office groups, of straight ticket mechanism for simultaneously setting for operation any desired candidate registers of the different groups irrespective of their position or location in the groups, and means for subsequently operating the registers so set.

2. In a voting machine, the combination with candidate registers arranged alphabetically in office groups, of straight ticket mechanism for simultaneously setting for operation the registers in each group devoted to the candidates of any desired party, and means for subsequently operating the registers so set.

3. In a voting machine, the combination with a plurality of candidate registers, of means for throwing them into office groups of any desired size containing any desired number of registers from two up, and straight ticket mechanism for simultaneously effecting the operation of all the registers of the candidates of any party.

4. In a voting machine, the combination with a plurality of candidate registers, of means for throwing them into office groups of any desired size containing any desired number of registers from two up, straight ticket mechanism for simultaneously effecting the operation of all the registers of the candidates of any party, and means for adjusting said straight ticket mechanism so as to include any desired registers in any desired party.

5. In a voting machine, the combination with plural series of candidate registers, of a single straight ticket mechanism adapted to be set to cause the simultaneous operation of all the candidate registers of any one party that may be selected at a single operation depending upon the setting of said mechanism, and means for setting said mechanism.

6. In a voting machine, the combination with candidate registers arranged in office groups, of candidate keys, the operation of which sets for operation the candidate registers with which they are connected, straight ticket mechanism for simultaneously setting for operation any desired candidate registers of the different groups irrespective of their position or location in the groups, and means for subsequently operating the registers so set.

7. In a voting machine, the combination with the candidate registers arranged alphabetically in office groups, of candidate keys similarly arranged, the operation of which sets for operation the registers to which they are connected, straight ticket mechanism for simultaneously setting for operation the registers in each group devoted to the candidates of any desired party, and means for subsequently operating the registers so set.

8. In a voting machine, the combination with a plurality of candidate registers, of candidate keys, the operation of which insures the operation of the candidate registers to which they are devoted, means for throwing said keys and registers into office groups of any desired size containing any desired number of registers from two up, and straight ticket mechanism for simultaneously effecting the operation of all the registers of the candidates of any party.

9. In a voting machine, the combination with a plurality of candidate registers, of candidate keys, the operation of which insures the operation of the candidate registers to which they are devoted, means for throwing said keys and registers into office groups of any desired size, straight ticket mechanism for simultaneously effecting the operation of all the registers of the candidates of any party, and means for adjusting said straight ticket mechanism so as to include any desired registers in any desired party.

10. In a voting machine, the combination of plural series of candidate registers, with candidate keys, the operation of which insures the operation of the candidate registers to which they are connected, a single straight ticket mechanism adapted to cause the simultaneous operation of all the candidates of any one party that may be selected at a single operation depending upon the adjustment of said mechanism, and means for adjusting said mechanism.

11. In a voting machine, the combination with candidate registers arranged in office groups, of candidate keys, the operation of which sets for operation the candidate registers with which they are connected, straight ticket mechanism which can be adjusted for simultaneously setting for operation any desired candidate registers of the different groups irrespective of their position or location in the groups connections between said keys and straight ticket mechanism for preventing the operation of more candidate registers than there are offices to be filled, and means for subsequently operating the registers so set.

12. In a voting machine, the combination with the candidate registers arranged alphabetically in office groups, of candidate keys similarly arranged, the operation of which sets for operation of the registers to which they are connected, straight ticket mechanism for simultaneously setting for operation the registers in each group devoted to the candidates of any desired party, connections between said keys and straight ticket mechanism for preventing the operation of more candidate registers than there are offices to be filled, and means for subsequently operating the registers so set.

13. In a voting machine, the combination with a plurality of candidate registers, of candidate keys, the operation of which insures the operation of the candidate registers to which they are devoted, means for throwing said keys and registers into office groups of any desired size containing any desired number of registers from two up, straight ticket mechanism for simultaneously effecting the operation of all the registers of the candidates of any party, and connections between said keys and straight ticket mechanism for preventing the operation of more candidate registers than there are offices to be filled.

14. In a voting machine, the combination with a plurality of candidate registers, of candidate keys, the operation of which insures the operation of the candidate registers to which they are devoted, means for throwing said keys and registers into office groups of any desired size containing any desired number of registers from two up, straight ticket mechanism for simultaneously effecting the operation of all the registers of the candidates of any party, means for adjusting said ticket mechanism so as to include any desired registers in any desired party, and connections between said keys and straight ticket mechanism for preventing the operation of more candidate registers than there are offices to be filled.

15. In a voting machine, the combination of plural series of candidate registers with candidate keys, the operation of which insures the operation of the candidate registers to which they are connected, a single straight ticket mechanism adapted to cause simultaneous operation of all the candidates of any one party that may be selected at a single operation depending upon the adjustment of said mechanism, means for adjusting said mechanism, and connections between said keys and straight ticket mechanism for preventing the operation of more candidate registers than there are offices to be filled.

16. In a voting machine, straight ticket mechanism comprising a support movable to different positions for different party tickets, and controlling members, such as pins, on said support arranged so that different pins are in operative position in different positions of said support.

17. In a voting machine, straight ticket mechanism comprising a support movable to different positions for different party tickets, and controlling members, such as pins, on said support arranged so that different pins are in operative position in the different positions of said support, said pins being interchangeably mounted on said support so that their position may be shifted on said member at will.

18. In a voting machine, straight ticket mechanism comprising a support movable to different positions corresponding in number to the parties presenting candidates for election, and controlling members, such as pins, corresponding in number to the candidates of all parties, arranged on said support so that at each position of the support all of the pins in the party to which said position of the support is devoted will be in operative position.

19. In a voting machine, straight ticket mechanism comprising a support movable to different positions corresponding in number to the parties presenting candidates for election, and controlling members, such as pins, corresponding in number to the candidates of all parties, arranged on said support so that at each position of the support all of the pins in the party to which said position of the support is devoted will be in operative position, said pins being interchangeably mounted on said support so that any desired grouping may be obtained.

20. In a voting machine, straight ticket mechanism comprising a support movable to different positions for different party tickets, controlling members, such as pins, on said support arranged so that different pins are in operative position in the different positions of said support, and means for automatically adjusting the support exactly in the position selected.

21. In a voting machine, the combination with the candidate registers, and keys controlling their individual operation, of straight ticket mechanism comprising a support movable to different positions for different party tickets, controlling members, such as pins, arranged on said support so that different pins are in operative position in the different positions of said support, and connections between said keys and straight ticket mechanism for preventing the operation of more candidate registers than there are offices to be filled.

22. In a voting machine, the combination with the candidate registers and keys controlling their individual operation, of straight ticket mechanism comprising a support movable to different positions for different party tickets, controlling members, such as pins, on said support arranged so that different pins are in operative position in the different positions of said support, said pins being adjustable to different positions on said support, and connections between said keys and straight ticket mechanism for preventing the operation of more candidate registers than there are offices to be filled.

23. In a voting machine, the combination with the candidate registers and keys controlling their individual operation, of straight ticket mechanism comprising a support movable to different positions corresponding in number to the parties presenting candidates for election, controlling members, such as pins, corresponding in number to the candidates of all parties and arranged upon said support so that each position of the support presents all of the pins in the party to which that position is devoted at operative position, and connections between said keys and straight ticket mechanism for preventing the operation of more candidate registers than there are offices to be filled.

24. In a voting machine, the combination in a casing with a series of registers of rods arranged in a single line and controlling the operation of the registers, and interlocking mechanism between said rods to prevent the simultaneous operation of more than a certain number of said rods; of a number of keys having their axes parallel to the rods but arranged apart therefrom in party columns and office rows; levers interposed between said rods and keys and pivoted to the casing, and means for subsequently operating the registers for which the controlling rods are set substantially as and for the purpose described.

25. In a voting machine, the combination in a casing with a series of rods arranged in a single line and controlling the operation of the registers, and interlocking mechanism between said rods to prevent the simultaneous operation of more than a certain number of said rods; of a number of keys having their axes parallel to the rods but arranged apart therefrom in party columns and office rows; and levers interposed between said rods and keys and pivoted to the casing, said levers being of the second class and arranged parallel to each other and constituting the longest sides of triangles of which the other sides are formed by the row of rods and the office rows of keys, substantially as and for the purpose described.

26. In a voting machine, the combination with a plurality of candidate registers capable of division into office groups of any desired number of parties without idle registers in any group, of straight ticket mechanism for actuating all the candidates of any one party, and capable of adjustment to accommodate as many or as few parties as may be desired.

27. In a voting machine, the combination with a plurality of candidate registers, key stop mechanism by which said registers may be divided into office groups of any desired size for any desired number of parties without idle registers in any group, and straight ticket mechanism for actuating all the candidates of any one party, capable of adjustment to accommodate as many or as few parties as may be desired.

28. In a voting machine, the combination with a plurality of candidate registers, key stop mechanism by which said registers may be divided into office groups, of any desired number for any desired number of parties without idle registers in any group, and straight ticket mechanism for actuating all of the candidates of any one party, capable of adjustment to accommodate as many or as few parties as may be desired, scratching keys for throwing into operation any desired candidate register outside of those for which the straight ticket mechanism is set, and connections between said scratching keys and straight ticket mechanism whereby the operation of a scratching key in a party group prevents the operation of any of the registers in that group by the straight ticket mechanism.

29. In a voting machine, a straight ticket mechanism comprising the shaft rotatable to different angular positions, a series of disks on said shaft capable of any desired angular adjustment and each having an actuating finger thereon, and means for securing each of said disks in the adjustment chosen.

30. In a voting machine, a straight ticket mechanism comprising the shaft rotatable to different angular positions, a series of disks on said shaft capable of any desired angular adjustment and each having an actuating finger thereon, and means for securing each of said disks in the adjustment chosen, consisting of a disk held from rotation on said shaft and having a lug fitting into any desired one of a series of apertures in the finger disk.

31. In a voting machine, a straight ticket mechanism comprising the shaft rotatable to different angular positions, a series of disks having notches therein corresponding in number to the angular positions of the shaft, each of said disks being capable of any desired adjustment and each having an actuating finger thereon, and a disk interposed between the finger disks held from rotation on said shaft and having lugs on each side thereof fitting into any desired notch of the series in the adjacent finger disks.

32. In a voting machine, a straight ticket mechanism comprising the shaft rotatable to different angular positions, a support on said shaft for each office group, fingers on said supports, each finger representing a candidate, and a spring interposed between said shaft and support for holding the latter yieldingly in a certain position relative to the shaft.

33. In a voting machine, a straight ticket mechanism comprising the shaft rotatable to different angular positions, a sleeve on said shaft for each office group, each sleeve being composed of a series of disks on said shaft capable of any desired angular adjustment and each having an actuating finger thereon and means for securing each of said disks in the adjustment chosen, and a spring interposed between said shaft and sleeve for holding the latter yieldingly in a certain position relative to the shaft.

34. In a voting machine a straight ticket mechanism comprising the shaft rotatable to different angular positions, a series of disks on said shaft capable of any desired angular adjustment, each having a series of notches therein corresponding to the different angular positions of the shaft, and each having an actuating finger thereon; of connecting disks interposed between said finger disk each having oppositely disposed lugs taking into notches in the finger disks and each having arms projecting into a groove on the shaft, and springs interposed between said arms and the edge of the groove in the shaft.

35. In a voting machine, a straight ticket mechanism, comprising the shaft rotatable to different angular positions, a series of disks on said shaft capable of any desired angular adjustment and each having an actuating finger thereon and radial channels therein, means for securing each of said disks in the adjustment chosen, and auxiliary fingers adapted to fit into any one of said channels.

36. In a voting machine, the combination with a series of candidate registers, of settable straight ticket mechanism for controlling the actuation of all the candidate registers pertaining to any desired party, said mechanism being capable of adjustment so as to actuate a single candidate register by use of the straight-ticket mechanism in voting for more than one straight party ticket, if desired, and means for simultaneously and subsequently operating the registers selected by setting said mechanism.

37. In a voting machine, the combination with a series of candidate registers arranged in office groups, of a single straight ticket mechanism for actuating all the candidate registers pertaining to any desired party, and means for arranging said straight ticket mechanism so as to make any desired candidate register operable by operating the straight ticket mechanism for any party or parties in which it may be desired to throw said register when preparing the machine for an election.

38. In a voting machine, the combination of the candidate registers, with a corresponding number of candidate keys, and a key board upon which said keys can be changeably grouped in any desired number of party columns or rows without changing the size of the keyboard or the number of keys.

39. In a voting machine, the combination of the candidate registers, with a corresponding number of candidate keys that can be changeably grouped in any desired number of party columns or rows without changing the size of the keyboard or the number of keys.

40. In a voting machine, the combination of the candidate registers, with a corresponding number of candidate keys, and a detachable key board upon which said keys can be changeably grouped in any desired number of party columns or rows without changing the size of the keyboard or the number of keys.

41. In a voting machine, the combination of the candidate registers, actuation-controlling members for said registers arranged in a single row, with a corresponding number of candidate keys detachably connected to said controlling members, and a key board upon which said keys can be changeably grouped in any desired number of party columns or rows.

42. In a voting machine, the combination of the candidate registers, with a corresponding number of actuation-controlling members, a key board having a series of rows of apertures therein equal to the maximum number of parties and each row containing as many holes as there are registers, candidate keys which can be grouped in said holes in any desired number of party columns or rows, and levers interposed between said keys and actuation-controlling members.

43. In a voting machine, the combination of the candidate registers, with the actuation-controlling members, a key board having a series of rows of apertures therein equal to the maximum number of parties and each row containing as many apertures as there are registers, keys which can be grouped in any desired number of party columns or rows passing through said apertures, fulcrum pieces adjustable in said apertures, and levers connecting the keys, actuation-controlling members and fulcrum pieces, all coöperating substantially as and for the purpose described.

44. In a voting machine, the combination with the key board, composed of two plates each having a series of rows of apertures therein equal to the maximum number of parties, and each row containing as many apertures as there are registers, keys in said apertures which can be grouped in any desired number of party columns or rows, adjustable fulcrum pieces in said apertures, and levers interposed between said plates and connecting each key with its corresponding fulcrum piece and actuating-controlling member.

45. In a voting machine, the combination with the actuating member, having the actuating lever pivoted thereto, of candidate selecting apparatus, a fulcrum movable into and out of operative relation with the lever by the said apparatus, and means actuated by the voter for swinging the free end of the actuating lever.

46. In a voting machine, the combination with the actuating member, having the actuating lever pivoted thereto, of candidate selecting apparatus, a fulcrum movable into and out of operative relation with the lever by the said apparatus, and means actuated by the voter for swinging the free end of the actuating lever, consisting of a rotary shaft having a cam lug thereon coöperating with the end of the actuating lever.

47. In a voting machine, the combination with the actuating member, having the actuating lever pivoted thereto, of candidate selecting apparatus a fulcrum movable into and out of operative relation with the lever by the said apparatus, means actuated by the voter for swinging the free end of the actuating lever, and means for returning the actuating member to its un-operated position.

48. In a voting machine, the combination with the actuating bar, having the actuating lever pivoted thereto, of candidate selecting apparatus a fulcrum movable into and out of operative relation with the lever by the said apparatus, means actuated by the voter for swinging the free end of the actuating lever, and means for returning the actuating bar to its un-operated position, said means consisting of a rotating shaft having an eccentric portion coöperating with the end of said bar.

49. In a voting machine, the combination with the actuating bar, having the actuating lever pivoted thereto, of candidate selecting apparatus a fulcrum movable into and out of operative relation with the lever by the said apparatus, a rotary shaft having a cam lug coöperating with the end of the actuating lever to swing it, and another rotary shaft having a cam thereon coöperating with the end of the actuating bar for returning it to normal position.

50. In a voting machine, the combination with the actuating member, having the actuating lever pivoted thereto, of candidate selecting apparatus a fulcrum movable into and out of operative relation with the lever by the said apparatus, means actuated by the voter for swinging the free end of the actuating lever, and means for returning the free end of said lever.

51. In a voting machine, the combination with the actuating member, having the actuating lever pivoted thereto, of a scratching key having a fulcrum for said actuating lever moved into operative position as the key is set, and means actuated by the voter for swinging the free end of the actuating lever.

52. In a voting machine, the combination with the actuating member, having the actuating lever pivoted thereto, of a straight ticket mechanism carrying a fulcrum for said lever which is moved into engagement with the lever when the straight ticket mechanism is set for the party to which the lever belongs and means actuated by the voter for swinging the free end of the actuating lever.

53. In a voting machine, the combination with a plurality of actuating bars arranged in office groups, each bar having an actuating lever pivoted thereto, of straight ticket mechanism carrying fulcrums for the actuating levers and arranged so that fulcrums corresponding to any party are moved into operating position when the straight ticket mechanism is set for that party, a scratching key for each actuating bar, connections for shifting the fulcrums of the straight ticket mechanism in any group out of operative position if a scratching key is operated in that group, and means for swinging the free end of the actuating lever.

54. In a voting machine, the combination with a plurality of candidate registers, of candidate selecting mechanism by which the operation of said registers is controlled, and actuating mechanism for said registers adjustable independently of the candidate-selecting mechanism to determine what registers may be actuated by the voter.

55. In a voting machine, the combination with a plurality of candidate registers, of candidate selecting mechanism by which the operation of said registers is controlled, actuating mechanism for said registers movable to different positions, and adjustable actuating members on said actuating mechanism by which the necessary different franchises can be arranged.

56. In a voting machine, the combination with a plurality of candidate registers, of candidate selecting mechanism by which the operation of said registers is controlled, an actuating shaft for said registers adjustable longitudinally, and cam lugs on said shaft which can be adjusted to different positions so that different franchises can be arranged.

57. In a voting machine, the combination with a plurality of candidate registers, of candidate selecting mechanism by which the operation of said registers is controlled, an actuating mechanism for said registers adjustable to determine the franchise to be given the voter, and an indicator visible for the voter to show how said actuating mechanism is adjusted.

58. In a voting machine, the combination with a plurality of candidate registers, of candidate selecting mechanism by which the operation of said registers is controlled, means for limiting the registers which can be operated by a voter, and an indicator visible to the voter within the booth showing how his franchise is limited.

59. In a voting machine, the combination with a plurality of candidate registers, of candidate selecting mechanism by which the operation of said registers is controlled, actuating mechanism for said registers adjustable to determine what registers may be actuated by the voter, and means out-side of the booth for adjusting and securing said mechanism.

60. In a voting machine, the combination with a plurality of candidate registers, of candidate selecting mechanism by which the operation of said registers is controlled, an actuating shaft adjustable longitudinally to determine what registers may be actuated by the voter, a collar on the end of the actuating shaft, a sliding block having a cam groove thereon coöperating with said collar, and a bar connected to said block and extending out-side of the casing by which the block can be moved to shift the position of the actuating shaft.

61. In a device of the class described, the combination with the casing, of the registers therein, a door permitting access to said registers, and locking mechanism between said door and registers to lock the latter from movement as soon as the former is opened.

62. In a device of the class described, the combination with the casing, of the registers therein, having notches in their peripheries, a door permitting access to said registers, and locking mechanism between said door and registers to lock the latter from movement comprising a bar which is swung into said notches by the opening movement of the door.

63. In a device of the class described, the combination with the casing, of the registers therein, having notches in their peripheries, a door permitting access to said registers, a bar suspended by a pair of links adjacent to the registers, and a pendant connected to the door and having an enlargement which serves to swing the bar into the notches as the pendant is raised.

64. In a device of the class described, the combination with the casing, of the registers therein, having notches in their peripheries, a door permitting access to said registers, a plurality of bars extending across the machine adjacent to the register wheels, cross pieces secured to the ends of the bars, links by which said cross pieces are suspended, abutments on said cross pieces, and the pendants suspended from the door and coöperating with the abutments and having the enlarged portion which serves to swing the bars into engagement with the registers when the door is open.

65. In a voting machine, the scratching key consisting of the blade having the aperture therein, and the fulcrum finger thereon.

66. In a voting machine, the scratching key consisting of the blade having the aperture therein, the fulcrum finger thereon, and the lug projecting from one side thereof.

67. In a voting machine, the combination with the straight ticket selecting apparatus movable to different positions for different parties, of a plurality of registers, means for operating said registers as selected, positioning mechanism tending to move said apparatus exactly to its chosen position acting independently of the operating means.

68. In a voting machine, the combination with the straight ticket selecting apparatus movable to different positions for different parties, of positioning mechanism tending to move said apparatus exactly to its chosen position, and means for locking it absolutely in the chosen position while the registers are being operated.

69. In a voting machine, the combination with the straight ticket selecting apparatus movable to different positions for different parties, of positioning mechanism tending to move said apparatus exactly to its chosen position, and means for locking it absolutely in the chosen position while the registers are being operated, and for freeing it from said mechanism while said apparatus is being reset.

70. In a voting machine, the combination with the straight ticket selecting apparatus movable to different positions for different parties, of positioning mechanism tending to move said apparatus exactly to its chosen position, means for resetting said selecting apparatus, and connections between said positioning mechanism and reseting mechanism for moving the former out of engagement with the selecting apparatus as it is being reset.

71. In a voting machine, the combination with the plurality of registers, of the plurality of candidate registers movable but one unit space at each operation, of the selecting apparatus adjustable to determine the candidate registers to be operated, means for operating the registers selected, and positioning mechanism tending to move said apparatus exactly to the chosen adjustment independently of the operating means.

72. In a voting machine, the combination with the selecting apparatus adjustable to determine the candidate registers to be operated, of positioning mechanism tending to move said apparatus exactly to the chosen adjustment, and means for locking said apparatus absolutely in the chosen position while the registers are being operated.

73. In a voting machine, the combination with the selecting apparatus adjustable to determine the candidate registers to be operated, of positioning mechanism tending to move said apparatus exactly to the chosen adjustment, and means for locking said apparatus absolutely in the chosen position while the registers are being operated, and for freeing it from said mechanism while said apparatus is being reset.

74. In a voting machine, the combination with the scratching keys movable into operative position, of a positioning apparatus tending to move them exactly to their operated or un-operated position, and mechanism for locking the positioning apparatus absolutely to hold the keys in the selected position while the registers are being operated.

75. In a voting machine, the combination with the scratching keys movable into operative position, of a positioning apparatus tending to move them exactly to their operated or un-operated position, as the case may be, and means for freeing said keys from the positioning apparatus while they are being reset.

76. In a voting machine, the combination with the scratching keys movable into operative position, of a positioning apparatus tending to move said keys exactly to their operated or un-operated position, means for reseting said keys, and connections between said positioning apparatus and resetting mechanism for moving the former out of engagement with the keys as they are being reset.

77. In a voting machine, the combination with the selecting apparatus, of the member controlling access to the selecting apparatus, and connections between said apparatus and member whereby the apparatus is locked from movement when the controlling member is opened and is un-locked when the controlling member is closed.

78. In a voting machine, the combination with the selecting apparatus, of the operating member moved to open or close the machine, and mechanism for locking said selecting apparatus as the registers are operated controlled by the position of said operating member, the mechanism being locked when the operating member is in the open position.

79. In a voting machine, the combination with the sprocket wheels mounted upon stationary supports, the sprocket wheels mounted on supports moved by the operation of a key, the sprocket tape or chain on said wheels, and means for locking any desired one of the sprocket wheels upon the stationary supports from movement to thereby form party groups of the keys.

80. In a voting machine, the combination with the stationary supports, sprocket wheels mounted thereon, and casings around said wheels, of the supports movable by the operation of the key, sprocket wheels mounted on said movable supports, the sprocket tape or chain on said wheels, and removable plugs passing through apertures in said casings and engaging the teeth of the sprocket wheels.

81. In a voting machine, the combination with the stationary supports having the flanged casings thereon, and the sprocket wheels mounted therein, other supports moved by the operation of their keys, the sprocket wheels mounted on said movable supports, the sprocket tape or chain on said wheels, and screw threaded plugs having apertures in the bodies thereof which can be screwed through said casings and over the teeth of the sprocket wheels to thereby form party groups of the keys.

82. In a voting machine, the combination with the stationary supports having the wheels thereon arranged with their axes in a single line, of the supports moved by the keys having the wheels thereon parallel to the wheels on the stationary supports, a tape on said wheels, and means for locking the tape at any points desired to make party groups of any desired size.

83. In a voting machine, the combination with the stationary supports having the wheels thereon arranged with their axes in a single line, of the supports moved by the keys having the wheels thereon, a tape on said wheels and means for locking the tape at any points desired to make party groups of any desired size, the wheels on one set of said supports being inclined relative to the wheels of the other set so as to bring their upper ends opposite certain wheels of the other set and to bring their lower ends opposite the adjacent wheels of the other set substantially as and for the purpose described.

84. In a voting machine, the combination with the register controlling members arranged in a single row, of the parallel plates having perforations therein arranged in columns and cross rows, keys movable parallel to the controlling members, levers connecting the keys and register controlling members, and fulcra for said levers, the perforations being adapted to receive any of the keys or fulcra so that the keys may be arranged in as many party columns as may be desirable.

85. In a voting machine, the combination with the register controlling members arranged in a single row, of the parallel plates having perforations therein arranged in columns and cross rows, the columns being parallel to the row of controlling members and on both sides thereof, keys movable parallel to the controlling members, levers of the second class connecting the keys and register controlling members, and fulcra for said levers, the outer columns of perforations being adapted to receive any of the keys or fulcra so that the keys may be arranged in as many party columns as may be desired.

86. In a voting machine, the combination with candidate registers, of candidate keys the operation of which insures the operation of the candidate registers to which they are connected, straight ticket mechanism for setting for operation all the registers of any desired one of the different party tickets at a single operation, means for throwing any register into any desired party ticket, and means for subsequently operating the registers so set.

87. In a voting machine, the combination with candidate registers, of candidate keys the operation of which insures the operation of the candidate registers to which they are connected, straight ticket mechanism for setting for operation all the registers of any desired one of the different party tickets at a single operation, connections between said keys and straight ticket mechanism for preventing the operation of more candidate registers than there are offices to be filled, and means for subsequently operating the registers so set.

88. In a voting machine, the combination with the register wheels having notched peripheries and arranged on two or more parallel axes and selective mechanism for operating the same, of a swinging frame carrying a corresponding number of bars parallel to the axes of the same, and means for moving said bars into engagement with the notches of said wheels to lock them from movement.

89. In a voting machine, straight ticket mechanism comprising a support movable to different positions for different party tickets, and members on said support arranged so that the registers for the candidates of different parties will be actuated with the support in different positions.

90. In a voting machine, straight ticket mechanism comprising a support movable to different positions for different party tickets, and members on said support arranged so that the registers for the candidates of different parties will be actuated with the support in different positions, said members being interchangeably mounted on said support so that their positions on said support may be shifted at will.

91. In a voting machine, straight ticket mechanism comprising a support movable to different positions corresponding in number to the parties presenting candidates for election, and members corresponding in number to the candidates of all parties, arranged on said support so that at each position of the support all the members in the party to which said position of the support is devoted will be in operative position.

92. In a voting machine, the combination with the registers arranged in office groups, of keys therefor, straight ticket mechanism comprising a support movable to different positions for different party tickets, members on said support arranged so that different ones are in operative position in the different positions of the support, and connections between said keys and members so that an operated key in any group will prevent the straight ticket mechanism operating in that group.

93. In a voting machine, the combination with the registers arranged in office groups, of keys therefor, straight ticket mechanism comprising a support movable to different positions for different party tickets, members on said support arranged so that different ones are in operative position in the different positions of the support, said members being interchangeably mounted on said support so that their position may be shifted thereon at will, and connections between said keys and members so that an operated key in any group will prevent the straight ticket mechanism operating in that group.

94. In a voting machine, the combination with the candidate selecting members arranged in party columns and office rows, of a single line of vote controlling members, levers interposed between the selecting members and controlling members whereby the movement of the selecting members moves the controlling members, candidate registers whose actuation is controlled by the position of the controlling members, and a line of limiting members parallel to the controlling members and serving to limit the number of the selecting members that may be simultaneously operated in each office group.

95. In a voting machine, the combination with the candidate registers, of the selecting mechanism therefor capable of separate actuation for individual candidates, and rotary straight-ticket selecting mechanism for simultaneously selecting all the members of any desired party depending upon its adjustment.

96. In a voting machine, the combination with the candidate registers, of the selecting mechanism therefor capable of separate actuation to select individual candidates, rotary straight-ticket selecting mechanism for simultaneously selecting all the members of any desired party depending upon its adjustment, and means for subsequently operating the registers selected.

97. In a voting machine, the combination with the registers operable but one unit space at a time, of selecting mechanism therefor, a movable member for controlling and operating the registers movable independently of the selecting mechanism, and controlling pieces on said member which can be set to different positions.

98. In a voting machine, the combination with the registers operable but one unit space at a time, of selecting mechanism therefor, an adjustable member for controlling and operating the registers movable independently of the selecting mechanism, and controlling pieces on said member which can be set to different positions.

99. In a voting machine, the combination with the registers operable but one unit space at a time, of selecting mechanism therefor, a rotatable shaft for controlling the registers that may be operated, movable independently of the selecting mechanism and controlling pieces on said shaft which can be set to different positions.

100. In a voting machine, the combination with the registers operable but one unit space at a time, of selecting mechanism therefor, a shaft adjustable to different positions for controlling the registers that may be operated, movable independently of the selecting mechanism and controlling pieces on said shaft which can be set to different positions.

101. In a voting machine, the combination with a plurality of movable ballot indicators and a corresponding plurality of registers operable but one unit space at a time adapted to coöperate therewith, of means for operating the registers operable without moving the indicators if they have been previously moved to operative position, and positively actuated means for moving each indicator when partially operated into full coöperative relation with its register preliminary to the actuation of the latter.

102. In a voting machine, the combination with a plurality of movable ballot indicators and a corresponding plurality of registers operable but one unit space at a time adapted to coöperate therewith, of means for causing the operation of any register when its indicator is in proper coöperative relation therewith without moving the indicator, means for setting in voted position any partially actuated indicator, and operating means for first operating said setting means and then the register-actuating devices.

103. In a voting machine, the combination with movable ballot indicators, registers operable but one unit space at a time coöperating therewith, and interlocking mechanism with which the indicators coöperate, of means for engaging and operating to full voted position all the indicators operatively engaged with the interlock, means for subsequently operating the registers whose indicators are thus moved to full voted position without any further movement of the indicators, and means for resetting the indicators without affecting the actuation of the registers.

104. In a voting machine, the combination with movable ballot indicators, registers operable but one unit space at a time coöperating therewith, and interlocking mechanism with which the indicators coöperate, of means for engaging, operating to full voted position and then releasing all the indicators operatively engaged with the interlock, means for subsequently operating the registers whose indicators are thus moved to voted position without any further movement of the indicators, and means for resetting the indicators without affecting the actuation of the registers.

105. In a voting machine, the combination with movable ballot indicators, interlock operating members connected thereto having projections, registers operable but one unit space at a time with which said indicators coöperate, and means for actuating the registers whose indicators are left in voted position without any further movement of the indicators, of a movable member coöperating with the projections on the interlock operating members for moving partially operated indicators to voted position, connections between the actuating means and member for operating the latter before the operation of the registers and means for resetting the indicators without affecting the actuation of the registers.

106. In a voting machine, the combination with ballot indicators, interlock operating members connected thereto having projections, and a movable bar adapted to coöperate with the projections, of a movable cam member coöperating immediately with the bar to operate and return it by a single movement in one direction, registers corresponding to the indicators and means for operating the registers for which the indicators have been operated without further movement of the indicators subsequently to the forward movement of the bar.

107. In a voting machine, the combination with ballot indicators, interlock operating members connected thereto, a movable bar adapted to coöperate with the members when the latter are partially operated, a pivoted arm connected to the bar, a movable cam coöperating with said arm to move the bar and members and disengage the bar therefrom by a movement in one direction, registers corresponding to the indicators and means for operating the registers for which the indicators have been operated without further movement of the indicators subsequently to the forward movement of the bar.

108. In a voting machine, the combination with plural series of keys grouped according to offices, of a corresponding plurality of interlock operating members moved thereby and arranged in a single row, projections on said members, a corresponding plurality of registers operable but one unit space at a time adapted to be operated if their keys are in proper operative position without moving the latter, a common bar extending parallel to the row of projections and adapted to engage any of said projections to carry the interlock operating members and their keys to completely operated position if they have been operated beyond a certain point, and means for first moving said bar and subsequently operating the registers.

109. In a voting machine, the combination with plural series of keys grouped according to offices, of a corresponding plurality of interlock operating members moved thereby and arranged in a single row, projections on said members, a corresponding plurality of registers adapted to be operated if their keys are in operative position, a common bar extending parallel to the row of projections and adapted to engage said projections to carry the interlock operating members and their keys to completely operated position if they have been operated beyond a certain point, a cam member for moving said bar to position the interlock operating members, and means for subsequently operating the registers whose keys are in operative position.

110. In a voting machine, a plurality of individual registers, individual indicators, a straight ticket indicator, straight-ticket-indicator-operated-mechanism comprising a shaft, and interchangeably adjustable parts thereon, whereby said straight-ticket-indicator-operated-mechanism may be put in operative relation to different registers corresponding to different tickets at the will of the voter, said indicator and said mechanism being operable and returnable without operating the registers.

111. In a voting machine, the combination with a booth opening and closing element, of candidate registers, coöperating candidate indicators whose final position prior to the opening of the booth determines whether or not the corresponding register shall be effectually actuated by the voter, and resetting means for the indicators operated by said element near the beginning of the booth-closing movement and toward the end of the booth-opening movement.

112. In a voting machine, the combination with a booth opening and closing element, of candidate registers, coöperating candidate indicators whose final position prior to the opening of the booth determines whether or not the corresponding registers shall be effectually actuated by the voter, register-operating means actuated by said element, and resetting means for the indicators also operated by said element, the registers being operated and the indicators subsequently reset during the opening movement of the element, and the resetting means for the indicators first operating and the register-actuating means subsequently operating during the booth-closing movement.

113. In a voting machine, the combination with a both opening and closing element reciprocating in one direction to open the booth and in another to close it, of candidate registers, coöperating candidate indicators freely movable into and out of operative position at two positions in each reciprocation of the element and whose final position prior to the opening of the booth determines whether or not the corresponding registers shall be effectually actuated by the voter, and resetting means for the indicators operated by said element near the beginning of the booth-closing movement and toward the end of the booth-opening movemet.

114. In a voting machine, the combination with a booth opening and closing element reciprocating in one direction to open the booth and in another to close it, of candidate registers, coöperating candidate indicators freely movable into and out of operative position at two positions in each reciprocation of the element and whose final position prior to the opening of the booth determines whether or not the corresponding registers shall be effectually actuated by the voter, register-operating means actuated by said element, and resetting means for the indicators operated by said element, the register-operating means being actuated in advance of the resetting means during the booth-opening movement of the element, and vice versa during the booth-closing movement.

115. In a voting machine, the combination with a booth opening and closing element, of candidate registers, coöperating candidate indicators whose final position prior to the opening of the booth determines whether or not the corresponding registers shall be effectually actuated by the voter, locking means for said indicators which permits their free movement into and out of operative position at two positions in each movement of the element, and resetting means for the indicators operated by said element near the beginning of the booth-closing movement and toward the end of the booth-opening movement.

116. In a voting machine, the combination with a booth opening and closing element, of candidate registers, coöperating candidate indicators whose final position prior to the opening of the booth determines whether or not the corresponding registers shall be effectually actuated by the voter, locking means for said indicators which permits them to be moved freely into and out of operative position at two positions of each movement of the booth-opening element, register-operating means actuated by said element, and resetting means for the indicators operated by said element, the resetting means operating in advance of the register-actuating means as the booth is closed, and vice versa as the booth is opened.

117. In a voting machine, a turn-stile, voting keys, a key-resetting device, and operating connections for said device between said keys and turn-stile operative to reset all keys left in voted position whether by ingoing or outgoing movement of said turn-stile.

JOHN HOWARD McELROY.

Witnesses:
LAWRENCE LARSEN,
J. McROBERTS.

Copies of this patent may be obtained for five cents each, by addressing the "Commissioner of Patents, Washington, D. C."